(12) United States Patent
Nelson et al.

(10) Patent No.: US 10,868,460 B2
(45) Date of Patent: Dec. 15, 2020

(54) PSC MOTOR HAVING MULTIPLE POLE CONFIGURATIONS FOR USE IN AT LEAST TWO DIFFERENT AIR MOVING DEVICES

(71) Applicant: Regal Beloit America, Inc., Beloit, WI (US)

(72) Inventors: Andrea Lena Nelson, Fort Wayne, IN (US); Matthew Ryan Logan, Fort Wayne, IN (US); Harry Robert Wilson, Fort Wayne, IN (US); Bryan James Stout, Fort Wayne, IN (US); Lester Benjamin Manz, Paulding, OH (US); John Sheldon Wagley, Winona Lake, IN (US)

(73) Assignee: Regal Beloit America, Inc., Beloit, WI (US)

( * ) Notice: Subject to any disclaimer, the term of this patent is extended or adjusted under 35 U.S.C. 154(b) by 289 days.

(21) Appl. No.: 15/913,232

(22) Filed: Mar. 6, 2018

(65) Prior Publication Data

US 2019/0280579 A1 Sep. 12, 2019

(51) Int. Cl.
| | |
|---|---|
| *H02K 17/08* | (2006.01) |
| *H02K 1/12* | (2006.01) |
| *H02K 1/22* | (2006.01) |
| *H02K 3/04* | (2006.01) |
| *F04D 13/12* | (2006.01) |
| *F04D 15/00* | (2006.01) |
| *F04D 13/06* | (2006.01) |
| *H02K 5/22* | (2006.01) |
| *H02K 17/06* | (2006.01) |
| *H02K 5/00* | (2006.01) |
| *H02K 9/06* | (2006.01) |

(52) U.S. Cl.
CPC ............ *H02K 17/08* (2013.01); *F04D 13/06* (2013.01); *F04D 13/12* (2013.01); *F04D 15/0066* (2013.01); *H02K 1/12* (2013.01); *H02K 1/22* (2013.01); *H02K 3/04* (2013.01); *H02K 5/225* (2013.01); *H02K 17/06* (2013.01); *H02K 5/00* (2013.01); *H02K 9/06* (2013.01)

(58) Field of Classification Search
CPC ...... F04D 13/06; F04D 13/12; F04D 15/0066; F04D 25/0606; H02K 17/08; H02K 1/12; H02K 1/22; H02K 3/04; H02K 5/00; H02K 17/06; H02K 5/225; H02K 9/06
USPC .......................................................... 310/71
See application file for complete search history.

(56) References Cited

U.S. PATENT DOCUMENTS

| | | | |
|---|---|---|---|
| 905,995 A | | 12/1908 | Danielson |
| 2,726,362 A | * | 12/1955 | Busch .................... H02K 17/04 318/753 |

(Continued)

*Primary Examiner* — Alex W Mok
(74) *Attorney, Agent, or Firm* — Armstrong Teasdale LLP

(57) ABSTRACT

A permanent split capacitor (PSC) motor includes a stator defining an axis of rotation and a rotor disposed adjacent the stator. The stator includes a start winding, a capacitor electrically coupled in series with the start winding, a first plurality of windings, and a second plurality of windings. The motor includes first and second sets of electrical leads connected respectively to the first plurality of windings and to the second plurality of windings, the first plurality of windings and the second plurality of windings respectively configured to rotate the motor respectively at a first and second rotational speeds of the motor when mounted respectively to the first machine and to the second machine.

20 Claims, 11 Drawing Sheets

(56) References Cited

U.S. PATENT DOCUMENTS

| | | | |
|---|---|---|---|
| 3,578,034 A | | 5/1971 | Eminger |
| 3,636,990 A | | 1/1972 | Eminger et al. |
| 3,811,630 A | | 5/1974 | Muskulus et al. |
| 3,851,682 A | | 12/1974 | Vogel et al. |
| 4,367,774 A | | 1/1983 | Arnold et al. |
| 4,486,699 A | * | 12/1984 | Hoemann ............... H02K 17/06 318/772 |
| 5,623,177 A | * | 4/1997 | Dimatteo ................ B60T 8/00 310/229 |
| 5,652,493 A | * | 7/1997 | Hendershot, Jr. .... H02K 19/103 318/400.17 |
| 5,931,430 A | * | 8/1999 | Palmer ................ E05B 47/0012 248/300 |
| 6,788,022 B2 | | 9/2004 | Sopko et al. |
| 2015/0171694 A1 | * | 6/2015 | Walsh ..................... H02K 3/47 310/156.43 |

\* cited by examiner

| 6 POLE | 6 POLE | 8 POLE | 8 POLE |
|---|---|---|---|
| LOW SPEED | LOW SPEED | HIGH SPEED | HIGH SPEED |
| CCW | CW | CCW | CW |
| LINE 1 TO PIN 1 | LINE 1 TO PIN 1 | LINE 1 TO PIN 1 | LINE 1 TO PIN 1 |
| LINE 2 TO PIN 5 | LINE 2 TO PIN 5 | LINE 2 TO PIN 5 | LINE 2 TO PIN 5 |
| START TO PIN 2 | START TO PIN 3 | START TO PIN 2 | START TO PIN 3 |
| TERMINAL BLOC TO 6 POLE MOTOR CONNECTION | TERMINAL BLOC TO 6 POLE MOTOR CONNECTION | TERMINAL BLOC TO 8 POLE MOTOR CONNECTION | TERMINAL BLOC TO 8 POLE MOTOR CONNECTION |
| YELLOW TO YELLOW | YELLOW TO BROWN | PURPLE TO PURPLE | PURPLE TO ORANGE |
| BROWN TO BROWN | BROWN TO YELLOW | ORANGE TO ORANGE | ORANGE TO PURPLE |

FIG. 10

PSC MOTOR HAVING MULTIPLE POLE CONFIGURATIONS FOR USE IN AT LEAST TWO DIFFERENT AIR MOVING DEVICES

BACKGROUND

The field of the disclosure relates generally to permanent split capacitor (PSC) motors, and more specifically, PSC motors with multiple speed and voltage configurations.

PSC motors are induction-based motors that include a plurality of windings and a capacitor for inducing a phase shift between windings, thereby increasing torque of a rotor. PSC motors are used in various systems, such as heating, ventilation, and air conditioning (HVAC) systems. For example, a PSC motor may be used to drive a fan in an exemplary HVAC system. Outdoor cooling fans for outdoor air conditioning condenser coils, such fans are designed to operate at only one of a plurality of operating speeds, for example, at 1125 or 825 RPM (revolutions per minute). The 1125 and 825 RPM fan speeds are typically provided by an 8-pole induction motor and by a 6-pole induction motor, respectfully However, at least some PSC motors have limited operating flexibility. That is, at least some PSC motors are limited to a single operating voltage and/or motor speed to prevent imbalanced performance and to limit the complexity of the motor. For example, some PSC motors are limited to a single motor speed because adding additional motor speeds to the motors may have reduced performance, particularly at lower speed settings, relative to the first motor speed.

Due to the limited operating flexibility, multiple configurations of a PSC motor for different operating voltages and/or motor speeds are manufactured. To prevent limited inventory of high-demand configurations and excessive inventory of low-demand configurations, the manufacturer monitors sales and stock levels and manufactures configurations based on the observations, which may increase manufacturing costs, increase inventory of low-demand configurations, and otherwise overcomplicate the manufacturing of the PSC motors.

Moreover, during installation of the motor, a technician determines the requirements of the system into which the motor is to be installed and selects a motor configuration that meets the requirements. If the technician does not have the correct motor configuration in the field, the technician may be required to travel to pick up the motor or order a new motor, which increases the time and cost of the installation.

BRIEF DESCRIPTION

In one aspect, a permanent split capacitor (PSC) motor is configured to be connected to a power source and to be coupled to a selected one of a first and a second machine. The first machine is configured to operate at a first machine rotational speed and the second machine is configured to operate at a second machine rotational speed. The first machine rotational speed is different from the second machine rotational speed.

The motor includes a housing, defining a cavity in the housing and having an external periphery of the housing. The motor also includes a stator positioned at least partially within the housing and defines an axis of rotation. The stator includes a body connected to the housing and a first set of windings having a plurality of coils and connected to the body and connectable to the power source and including of a first number of coils. The first set of windings are configured to provide a first rotational speed of the motor when the first set of windings are energized by the power source. The first set of windings are configured for use with the first machine.

The motor also includes a second set of windings having a plurality of coils and connected to the body and connectable to the power source. The second set of winding include a first number of coils, the second set of windings configured to provide a second rotational speed of the motor when the second set of windings are energized by the power source and when the first set of windings are not energized, the first set of windings being different than the second set of windings, the second rotational speed of the motor being different from the first rotational speed of the motor, the second set of windings configured for use with the second machine.

The motor also includes a rotor disposed adjacent the stator and configured to rotate relative to the stator about the axis of rotation induced at least partially by a magnetic output of one of the first set of windings and the second set of windings, the first set of windings configured for use with the first machine to rotate the first machine at the first machine rotational speed and the second set of windings configured for use with the second machine to rotate the second machine at the second machine rotational speed.

The motor also includes a first set of electrical leads, at least one of the leads of the first set of electrical leads electrically connected to the first set of windings, the first set of electrical leads connectable to the power source and configured to rotate the motor at the first rotational speed of the motor and, when mounted to the first machine, to operate the first machine at the first machine rotational speed.

The motor also includes a second set of electrical leads, at least one of the leads of the second set of electrical leads electrically connected the second set of windings, the second set of electrical leads connectable to the power source and configurated to rotate the motor at the second rotational speed of the motor and, when mounted to the second machine, to operate the second machine at the second rotational speed, at least one of the leads of the second set of electrical leads being different than at least one of the leads of the first set of electrical leads.

In another aspect, the PSC motor may be configured wherein the first set of windings defines a first operating rotational speed and such that the second set of windings defines a second operating rotational speed, different from the first operating rotational speed.

In another aspect, the PSC motor may be configured wherein the first set of windings defines a winding configuration with a first set of motor poles and such that the second set of windings defines a winding configuration with a second set of motor poles, different from the first set of motor poles.

In another aspect, the PSC motor may be configured wherein the first set of windings defines a six-pole winding configuration and such that the second set of windings defines an eight-pole winding configuration.

In another aspect, the PSC motor may be configured wherein the first set of windings and the second set of windings are main windings and the PSC motor may further include a first set of start windings having a set of coils, a second set of start windings having a plurality of coils, and a capacitor electrically coupled in series with a selected one of the first set of start windings and second set of start windings.

In another aspect, the PSC motor may be configured wherein at least the first rotational speed of the motor is in a clockwise direction. The PSC motor may further include a third set of electrical leads. At least one of the leads of the third set of electrical leads may be electrically connected to the first set of windings. The third set of electrical leads may be connected to the power source to rotate the motor at a counterclockwise rotational direction of the first rotational speed of the motor. When the motor is mounted to the first machine, the motor may operate the first machine at the first machine rotational speed. At least one of the leads of the third set of electrical leads is different than at least one of the leads of the first set of electrical leads.

In another aspect, the PSC motor may be configured wherein at least the second rotational speed of the motor is in a clockwise direction. The PSC motor may further include a fourth set of electrical leads. At least one of the leads of the fourth set of electrical leads is electrically connected to the second set of windings. The fourth set of electrical leads may be connected to the power source to rotate the motor at a counterclockwise rotational direction of the second rotational speed of the motor. When mounted to the first machine, the motor may operate the second machine at the second machine rotational speed. At least one of the leads of the fourth set of electrical leads may be different than at least one of the leads of the second set of electrical leads.

In another aspect, the PSC motor may be configured wherein a plurality of the leads of the first set of electrical leads are extendable outside the cavity of the housing and wherein a plurality of the leads of the second set of electrical leads are extendable outside the cavity of the housing.

The PSC motor may further include instructions for connecting the plurality of the leads of the first set of electrical leads extendable outside the cavity of the housing to the power source to provide the first rotational speed of the motor.

The PSC motor may further include instructions for connecting the plurality of the leads of the second set of electrical leads extendable outside the cavity of the housing to the power source to provide the second rotational speed of the motor.

In another aspect, the PSC motor may further include a terminal connected to one of the leads of one of the first set of electrical leads extendable outside the cavity of the housing and the second set of electrical leads extendable outside the cavity of the housing.

In another aspect, the PSC motor may further include a first terminal is connected to one of the leads of the first set of electrical leads, a second terminal connected to another one of the leads of the first set of electrical leads, a first motor terminal block defining a first receptacle for receiving the first terminal, and a second receptacle for receiving the second terminal.

The PSC motor may further include a third terminal connected to one of the leads of the second set of electrical leads, a fourth terminal connected to another one of the leads of the second set of electrical leads, a second motor terminal block defining a third receptacle for receiving the third terminal and a fourth receptacle for receiving the fourth terminal, and a machine terminal block for cooperation with at least one of the first motor terminal block and the second motor terminal block. The machine terminal block may be electrically connected to the power source to operate the motor at one of the first motor speed and the second motor speed.

In another aspect, the PSC motor may be configured wherein the machine terminal block cooperates with the first motor terminal block and with the second motor terminal block, the machine terminal block having first and second orientations with respect to the first motor terminal block and with respect to the second motor terminal block, so that the first orientations provide for a clockwise rotation of the motor and so that the second orientations provide for a counterclockwise rotation of the motor.

In another aspect, the PSC motor may be configured wherein the first mentioned machine terminal block cooperates with the first motor terminal block and with the second motor terminal block to provide for a clockwise rotation of the motor and so that the second orientations provide for a counterclockwise rotation of the motor. The PSC motor may further include a second machine terminal block for cooperation the first motor terminal block and with the second motor terminal block to provide for a counterclockwise rotation of the motor.

In another aspect, the PSC motor may further include a motor terminal block for receiving the leads of the first set of electrical leads, for receiving the leads of the second set of electrical leads, for receiving the leads of the third set of electrical leads, and for receiving the leads of the fourth set of electrical leads. The PSC motor may further include a machine terminal block for cooperation with the motor terminal block. The machine terminal block may be electrically connected to the power source to operate the motor at one of the first motor speed in a clockwise direction, the first motor speed in a counterclockwise direction, the second motor speed in a clockwise direction, and the second motor speed in a counterclockwise direction. The machine terminal block may have first, second, third and fourth orientations with respect to the motor terminal block. The first orientation provides for a clockwise rotation of the motor at the first motor speed. The second orientations provide for a counterclockwise rotation of the motor at the first motor speed. The third orientation provides for a clockwise rotation of the motor at the second motor speed, and so that the fourth orientation provides for a counterclockwise rotation of the motor at the second motor speed.

In another aspect, the PSC motor may further include a mechanism connected to the third set of electrical leads and to the fourth set of electrical leads. The mechanism may be used to selectively configure the third set of electrical leads to rotate the motor at the second and counterclockwise rotational direction of the first rotational speed of the motor and may be used to selectively configure the fourth set of electrical leads to rotate the motor at the second and counterclockwise rotational direction of the second rotational speed of the motor.

In another aspect, a permanent split capacitor (PSC) motor is provided. The PSC motor may be connected to a power source and a heating, ventilation, and air conditioning (HVAC) system. The PSC motor may couple either a first air moving device designed to be operated at a first rotational speed or a second air moving device designed to be operated at a second rotational speed, different from the first rotational speed.

The motor may include a housing, defining a cavity therein and having an external periphery thereof. The motor may also include a stator positioned at least partially within the housing and defining an axis of rotation. The stator includes a body connected to the housing and a first set of windings. The first set of windings. The first set of windings has a plurality of coils. The first set of windings is connected to the body and to the power source. The first set of windings includes of a first number of coils. The first set of windings provides a first rotational speed of the motor when the first set of windings are energized by the power source. The first set of windings is used with the first air moving device.

The motor may further include a second set of windings having a plurality of coils and may be connected to the body. The second set of windings may be connectable to the power source and may include a first number of coils. The second set of windings are configured to provide a second rotational speed of the motor when the second set of windings are energized by the power source and when the first set of windings are not energized. The first set of windings are different than the second set of windings. The second rotational speed of the motor is different from the first rotational speed of the motor. The second set of windings are configured for use with the second air moving device.

The motor may further include a rotor disposed adjacent the stator and configured to rotate relative to the stator about the axis of rotation. The rotation may be induced at least partially by a magnetic output of one of the first set of windings and the second set of windings. The first set of windings may be configured for use with the first air moving device to rotate the first air moving device at the first air moving device rotational speed and the second set of windings may be configured for use with the second air moving device to rotate the second air moving device at the second air moving device rotational speed.

The motor may further include a first set of electrical leads. At least one of the leads of the first set of electrical leads electrically connected to the first set of windings. The first set of electrical leads may be connected to the power source and may be configured to rotate the motor at the first rotational speed of the motor. The motor, when mounted to the first air moving device, may operate the first air moving device at the first air moving device rotational speed.

The motor may further include a second set of electrical leads. At least one of the leads of the second set of electrical leads electrically may be connected to the second set of windings. The second set of electrical leads may be connectable to the power source and may be configured to rotate the motor at the second rotational speed of the motor. The motor, when mounted to the second air moving device, may operate the second air moving device at the second rotational speed. At least one of the leads of the second set of electrical leads are different than at least one of the leads of the first set of electrical leads.

In another aspect, the PSC motor may be configured wherein first set of windings and the second set of windings are main windings. The PSC motor may further include a first set of start windings having a first number of windings. The PSC motor may further include a second set of start windings electrically coupled to the first set of windings.

The second set of windings may include the second number of windings. The PSC motor may further include a capacitor electrically coupled in series with a selected one of the first set of start windings and second first set of start windings.

In another aspect, the PSC motor may be configured wherein at least the first rotational speed of the motor is in a clockwise direction. The PSC motor may further include a third set of electrical leads. At least one of the leads of the third set of electrical leads is electrically connected to the first set of windings. The third set of electrical leads may be connected to the power source to rotate the motor at a counterclockwise rotational direction of the first rotational speed of the motor. The motor, when mounted to the first air moving device, operates the first air moving device at the first air moving device rotational speed. At least one of the leads of the third set of electrical leads is different than at least one of the leads of the first set of electrical leads. At least the second rotational speed of the motor is in a clockwise direction.

The PSC motor further includes a fourth set of electrical leads. At least one of the leads of the fourth set of electrical leads is electrically connected to the second set of windings. The fourth set of electrical leads may be connected to the power source to rotate the motor at a counterclockwise rotational direction of the second rotational speed of the motor. The motor, when mounted to the first air moving device, operates the second air moving device at the second air moving device rotational speed. At least one of the leads of the fourth set of electrical leads is different than at least one of the leads of the second set of electrical leads.

The PSC motor further includes a mechanism connected to the third set of electrical leads and to the fourth set of electrical leads. The mechanism selectively configures the third set of electrical leads to rotate the motor at the second and counterclockwise rotational direction of the first rotational speed of the motor for configuring the fourth set of electrical leads to rotate the motor at the second and counterclockwise rotational direction of the second rotational speed of the motor.

In another aspect, the PSC motor may be configured wherein at least the first rotational speed of the motor is in a clockwise direction. The PSC motor may further include a third set of electrical leads. At least one of the leads of the third set of electrical leads is electrically connected to the first set of windings. The third set of electrical leads may be connected to the power source to rotate the motor at a counterclockwise rotational direction of the first rotational speed of the motor. The motor, when mounted to the first air moving device, operates the first air moving device at the first air moving device rotational speed. At least one of the leads of the third set of electrical leads is different than at least one of the leads of the first set of electrical leads. The second rotational speed of the motor is in a clockwise direction. The motor further includes a fourth set of electrical leads. At least one of the leads of the fourth set of electrical leads is electrically connected to the second set of windings. The fourth set of electrical leads may be connected to the power source to rotate the motor at a counterclockwise rotational direction of the second rotational speed of the motor. The motor, when mounted to the first air moving device, operates the second air moving device at the second air moving device rotational speed. At least one of the leads of the fourth set of electrical leads is different than at least one of the leads of the second set of electrical leads.

The PSC motor further includes a first terminal connected to one of the leads of the first set of electrical leads and a second terminal connected to another one of the leads of the first set of electrical leads.

The PSC motor further includes a first motor terminal block defining a first receptacle for receiving the first terminal and a second receptacle for receiving the second terminal.

The PSC motor further includes a third terminal connected to one of the leads of the second set of electrical leads and a fourth terminal connected to another one of the leads of the second set of electrical leads.

The PSC motor further includes a second motor terminal block defining a third receptacle for receiving the third terminal and a fourth receptacle for receiving the fourth terminal.

The PSC motor further includes an air moving device terminal block for cooperation with at least one of the first motor terminal block and the second motor terminal block.

The air moving device terminal block may be electrically connectable to the power source to operate the motor at one of the first motor speed and the second motor speed.

In another aspect, the PSC motor may be configured wherein the air moving device terminal block cooperates with the first motor terminal block and with the second motor terminal block. The air moving device terminal block has first and second orientations with respect to the first motor terminal block and with respect to the second motor terminal block, so that the first orientations provide for a clockwise rotation of the motor and so that the second orientations provide for a counterclockwise rotation of the motor.

In another aspect, the PSC motor may be configured wherein the first mentioned air moving device terminal block cooperates with the first motor terminal block and with the second motor terminal block to provide for a clockwise rotation of the motor and so that the second orientations provide for a counterclockwise rotation of the motor. The PSC motor further includes a second air moving device terminal block for cooperation the first motor terminal block and with the second motor terminal block to provide for a counterclockwise rotation of the motor.

In another aspect, a heating, ventilation, and air conditioning (HVAC) system configured to be connected to a power source is provided. The system includes a first condenser cooling fan designed to be operated at a first rotational speed or a second condenser cooling fan designed to be operated at a second rotational speed, different from the first rotational speed. The system also includes a permanent split capacitor (PSC) motor configured to be connected to the power source and for coupling to one of the first condenser cooling fan and the second condenser cooling fan. The motor includes a housing that defines a cavity and has an external periphery. The motor also includes a stator positioned at least partially within the housing and defining an axis of rotation. The stator includes a body connected to the housing, a first set of windings and a second set of windings.

The first set of windings have a set of coils and are connected to the body and are connectable to the power source. and including of a first number of coils, the first set of windings configured to provide a first rotational speed of the motor when the first set of windings are energized by the power source. The first set of windings are configured for use with the first condenser cooling fan.

The motor also includes a second set of windings having a set of coils and connected to the body. The second set of windings is connectable to the power source and includes of a first number of coils. The second set of windings provide a second rotational speed of the motor when the second set of windings are energized by the power source and when the first set of windings are not energized. The first set of windings are different than the second set of windings. The second rotational speed of the motor is different from the first rotational speed of the motor. The second set of windings are configured for use with the second condenser cooling fan.

The motor also includes a rotor disposed adjacent the stator and configured to rotate relative to the stator about the axis of rotation at a selected one of the set of motor speeds induced at least partially by a magnetic output of one of the first set of windings and the second set of windings. The first set of windings is configured for use with the first condenser cooling fan to rotate the first condenser cooling fan at the first condenser cooling fan rotational speed and the second set of windings are configured for use with the second condenser cooling fan to rotate the second condenser cooling fan at the second condenser cooling fan rotational speed.

The motor also includes a first set of electrical leads and a second set of electrical leads. At least one of the leads of the first set of electrical leads is electrically connected to at least one of the first set of windings. The first set of electrical leads is connectable to the power source and to the first condenser cooling fan to rotate the motor at the first rotational speed of the motor. When mounted to the first condenser cooling fan, the motor operates the first condenser cooling fan at the first condenser cooling fan rotational speed.

At least one of the leads of the second set of electrical leads is electrically connected to at least one of the second set of windings. The second set of electrical leads is connectable to the power source and to the second condenser cooling fan to rotate the motor at the second rotational speed of the motor. When the motor is mounted to the second condenser cooling fan, the motor operates the second condenser cooling fan at the second rotational speed. At least one of the leads of the second set of electrical leads are different than at least one of the leads of the first set of electrical leads.

In another aspect, the HVAC system may be provided wherein at least the first rotational speed of the motor is in a clockwise direction. The motor may further include a third set of electrical leads. At least one of the leads of the third set of electrical leads is electrically connected to the first set of windings. The third set of electrical leads is connectable to the power source to rotate the motor at a counterclockwise rotational direction of the first rotational speed of the motor. When the motor is mounted to the first condenser cooling fan, the motor operates the first condenser cooling fan at the first condenser cooling fan rotational speed. At least one of the leads of the third set of electrical leads being different than at least one of the leads of the first set of electrical leads.

In another aspect, the HVAC system may be provided wherein at least the second rotational speed of the motor is in a clockwise direction. The motor may further include a fourth set of electrical leads. At least one of the leads of the fourth set of electrical leads is electrically connected to the second set of windings. The fourth set of electrical leads is connectable to the power source to rotate the motor at a counterclockwise rotational direction of the second rotational speed of the motor. When the motor is mounted to the first condenser cooling fan, the motor operates the second condenser cooling fan at the second condenser cooling fan rotational speed. At least one of the leads of the fourth set of electrical leads is different than at least one of the leads of the second set of electrical leads.

The motor may further include a first terminal connected to one of the leads of the first set of electrical leads and a second terminal connected to another one of the leads of the first set of electrical leads.

The motor may further include a first motor terminal block defining a first receptacle for receiving the first terminal and a second receptacle for receiving the second terminal.

The motor may further include a third terminal connected to one of the leads of the second set of electrical leads and a fourth terminal connected to another one of the leads of the second set of electrical leads.

The motor may further include a second motor terminal block defining a third receptacle for receiving the third terminal and a fourth receptacle for receiving the fourth terminal.

The motor may further include a condenser cooling fan terminal block for cooperation with at least one of the first motor terminal block and the second motor terminal block, the condenser cooling fan terminal block electrically connectable to the power source to operate the motor at one of the first motor speed and the second motor speed.

The condenser cooling fan terminal block may cooperate with the first motor terminal block and with the second motor terminal block. The condenser cooling fan terminal block may have first and second orientations with respect to the first motor terminal block and with respect to the second motor terminal block, so that the first orientations provide for a clockwise rotation of the motor and so that the second orientations provide for a counterclockwise rotation of the motor.

In another aspect, the HVAC system may be provided wherein at least the first rotational speed of the motor is in a clockwise direction. The motor may further include a third set of electrical leads. At least one of the leads of the third set of electrical leads may be electrically connected to the first set of windings. The third set of electrical leads may be connectable to the power source to rotate the motor at a counterclockwise rotational direction of the first rotational speed of the motor. When the motor is mounted to the first condenser cooling fan the motor operates the first condenser cooling fan at the first condenser cooling fan rotational speed. At least one of the leads of the third set of electrical leads is different than at least one of the leads of the first set of electrical leads. The motor may be provided wherein at least the second rotational speed of the motor is in a clockwise direction. The motor may further include a fourth set of electrical leads. At least one of the leads of the fourth set of electrical leads electrically may be connected to the second set of windings. The fourth set of electrical leads may be connectable to the power source to rotate the motor at a counterclockwise rotational direction of the second rotational speed of the motor. When the motor is mounted to the first condenser cooling fan, the motor operates the second condenser cooling fan at the second condenser cooling fan rotational speed. At least one of the leads of the fourth set of electrical leads is different than at least one of the leads of the second set of electrical leads.

The motor may further include a first terminal is connected to one of the leads of the first set of electrical leads and a second terminal connected to another one of the leads of the first set of electrical leads.

The motor may further include a first motor terminal block defining a first receptacle for receiving the first terminal and a second receptacle for receiving the second terminal The motor may further include a third terminal connected to one of the leads of the second set of electrical leads and a fourth terminal connected to another one of the leads of the second set of electrical leads.

The motor may further include a second motor terminal block defining a third receptacle for receiving the third terminal and a fourth receptacle for receiving the fourth terminal.

The motor may further include a condenser cooling fan terminal block for cooperation with at least one of the first motor terminal block and the second motor terminal block. The condenser cooling fan terminal block electrically may be connectable to the power source to operate.

The PSC motor may be configured wherein the first mentioned condenser cooling fan terminal block cooperates with the first motor terminal block and with the second motor terminal block to provide for a clockwise rotation of the motor and so that the second orientations provide for a counterclockwise rotation of the motor. The motor may further include a second condenser cooling fan terminal block for cooperation the first motor terminal block and with the second motor terminal block to provide for a counterclockwise rotation of the motor.

BRIEF DESCRIPTION OF THE DRAWINGS

FIG. 10 is an exemplary installation guide that may be utilized in a PSC motor in the system shown in FIG. 1.

DETAILED DESCRIPTION

A permanent split capacitor (PSC) motor is configured to be connected to a power source and to be coupled to a selected one of a first and a second machine. The first machine is configured to operate at a first machine rotational speed and the second machine is configured to operate at a second machine rotational speed. The first machine rotational speed is different from the second machine rotational speed.

The motor includes a housing, defining a cavity in the housing and having an external periphery of the housing. The motor also includes a stator positioned at least partially within the housing and defines an axis of rotation. The stator includes a body connected to the housing and a first set of windings having a plurality of coils and connected to the body and connectable to the power source and including of a first number of coils. The first set of windings are configured to provide a first rotational speed of the motor when the first set of windings are energized by the power source. The first set of windings are configured for use with the first machine.

The motor also includes a second set of windings having a plurality of coils and connected to the body and connectable to the power source. The second set of winding include a first number of coils, the second set of windings configured to provide a second rotational speed of the motor when the second set of windings are energized by the power source and when the first set of windings are not energized, the first set of windings being different than the second set of windings, the second rotational speed of the motor being different from the first rotational speed of the motor, the second set of windings configured for use with the second machine.

Figure 1:
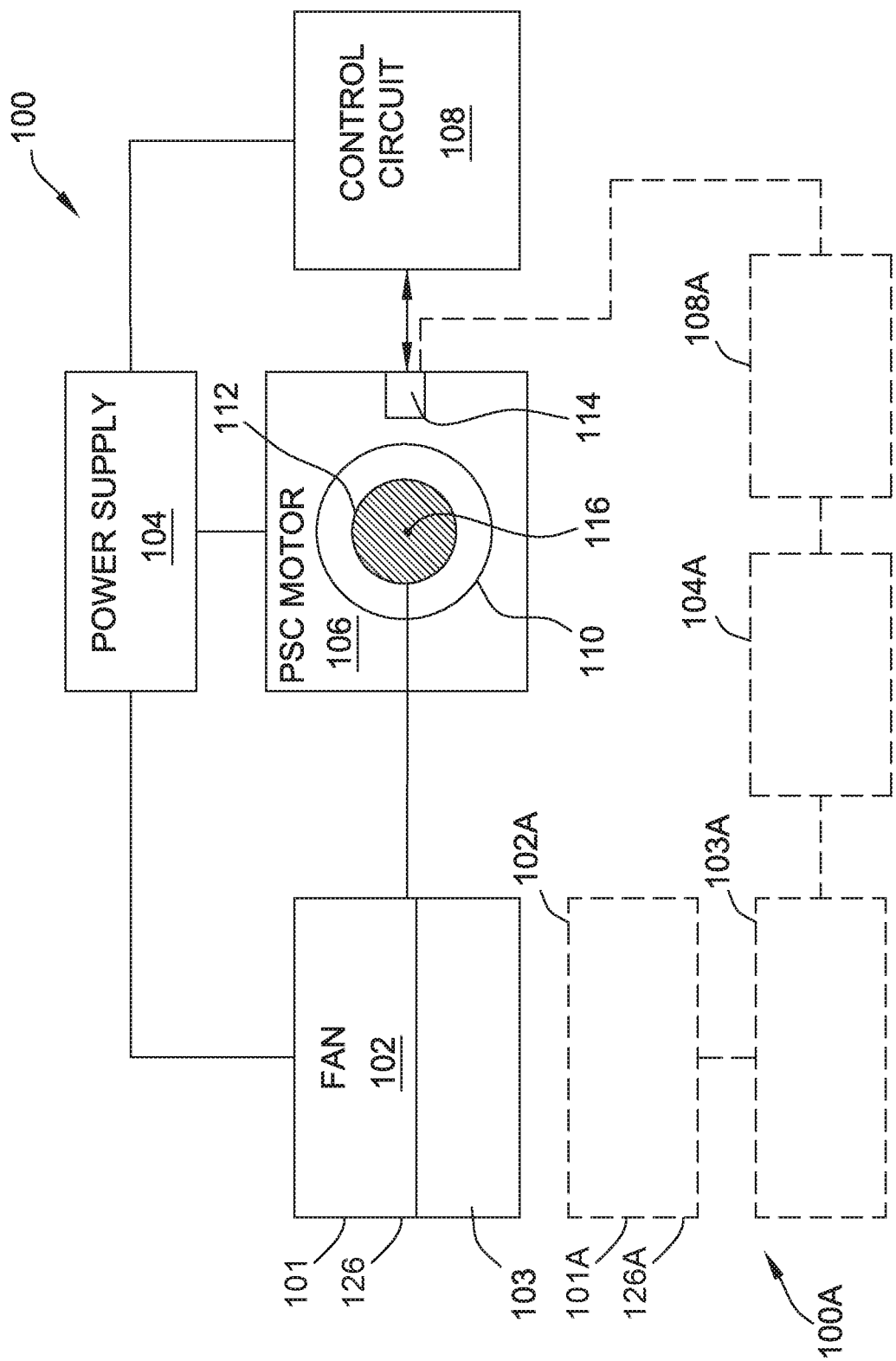
FIG. 1 shows first and second distinct exemplary heating, ventilation, and air conditioning (HVAC) systems that each require with a permanent split capacitor (PSC) motor, each of the systems requiring a motor that operates at a different speed.

FIG. 1 is a schematic diagram of exemplary HVAC systems 100 and 100A. The HVAC system 100 includes a fan or blower 102, a refrigerant condenser coils 103, a power supply 104, a permanent split capacitor (PSC) motor 106, and a control circuit 108. In other embodiments, system 100 includes additional, fewer, or alternative components, including those described elsewhere herein.

While, as shown FIG. 1, the motor 106 is a PSC motor, any motor may be configured with the additional coils that may be selectively energized to provide for a motor that may operate at one of two speeds. For example, the motor 106 may be an induction motor with or without start coils and start capacitors.

Fan 102 is configured to circulate air over the condenser coils to extract heat from the condenser coils 103 generated by the refrigeration cycle. That is, air is drawn into fan and is forced onto the condenser coils 103 to decrease the temperature of the condenser coils 103. The fan 102 has a certain number of blades with a prescribed shape and attack angle and is designed to operate at a first speed. Additionally, or alternatively, system 100 may include other components from regulating ambient temperature, including, but not limited to, additional blowers, fan blades, compressors, passive cooling systems, and the like.

As shown in FIG. 1, the power supply 104 is electrically coupled to a fan blade 102, motor 106, and control circuit 108 to provide electrical power to system 100. In some embodiments, power supply 104 is a power storage device (e.g., a battery). In some embodiments the power supply 104 comes from or is controlled by and control circuit 108 for controlling, the machine, for example, a HVAC system. In other embodiments, power supply 104 is coupled to a power grid to receive and condition power from the grid. In certain embodiments, power supply 104 is coupled to control circuit 108 to enable control 108 to selectively provide power to fan blade 102 and/or motor 106. In such embodiments, power supply 104 may be integrated with control circuit 108.

Motor 106 is coupled to fan 102, power supply 104, and control circuit 108. Motor 106 is configured to operate fan 102. Fan 102 operates in response to a mechanical output (i.e., rotation) of motor 106.

As shown in FIG. 1, the HVAC system 100A includes a fan 102A, refrigerant condenser coils 103A, a power supply 104A, PSC motor 106, and a control circuit 108A. In other embodiments, system 100A includes additional, fewer, or alternative components, including those described elsewhere herein. The power supply 104A and the control circuit 108A may be similar or identical to power supply 104 and control circuit 108.

The fan 102A and the refrigerant condenser coils 103A, may be similar or identical to the fan 102 and the refrigerant condenser coils 103, but typically the fan 102A and/or the refrigerant condenser coils 103A are substantially different than the fan 102 and the refrigerant condenser coils 103. In fact, it is the difference of the fan 102A from the fan 102 that may necessitate that the fan 102A operate at a different speed than fan 102 which requires the PSC motor 106 to be operable at those different speeds.

Fan 102A is configured to circulate air over the condenser coils extract heat from the condenser coils 103A generated by the refrigeration cycle. That is, air is drawn into fan and is forced over the condenser coils 103A to decrease the temperature of the condenser coils 103A. The fan 102A has a certain number of blades with a prescribed shape and attack angle and is designed to operate at a second speed, substantially different from the first speed of fan 102.

Additionally or alternatively, system 100A may include other components from regulating ambient temperature, including, but not limited to, additional blowers, fan blades, compressors, passive cooling systems, and the like.

When a service person arrives at a residence or business to resolve a repair call, the machine or its parameters may not be known by the owner or service person. For example, for outdoor cooling fans for outdoor air conditioning condenser coils, such fans are designed to operate at only one of a plurality of operating speeds, for example, at 1125 or 825 RPM (revolutions per minute). The 1125 and 825 RPM fan speeds are typically provided by an 8-pole induction motor and by a 6-pole induction motor, respectfully. If the service person does not keep both a 1125 RPM motor and an 825 RPM motor in his service truck, a second service call may be needed, with added costs and delays to the owner. Having a motor such as that envisioned by the current invention would be able to operate at either 1125 RPM or 825 RPM, since such a motor would be constructed with both 8-pole windings and 6-pole windings. Such a motor with both 8-pole windings and 6-pole windings may reduce service persons inventory and/or additional service calls.

Power supply 104A is electrically coupled to at least one of fan 102A, motor 106, and control circuit 108A to provide electrical power to system 100. In some embodiments, power supply 104A is a power storage device (e.g., a battery). In other embodiments, power supply 104A is coupled to a power grid to receive and condition power from the grid. In certain embodiments, power supply 104A is coupled to control circuit 108 to enable control 108 to selectively provide power to fan 102A and/or motor 106. In such embodiments, power supply 104 may be integrated with control circuit 108.

Motor 106 is coupled to fan 102A, power supply 104A, and control circuit 108A. Motor 106 is configured to operate fan 102. In particular, fan 102A operates in response to a mechanical output (i.e., rotation) of motor 106.

As shown in FIG. 1, motor 106 includes a stator 110, a rotor 112, and a wiring interface 114. In the exemplary embodiment, stator 110 defines an axis of rotation 116. Rotor 112 is disposed adjacent stator 110 and is configured to rotate relative to stator 110 about axis of rotation 116. More specifically, stator 110 includes a plurality of windings (see FIG. 4) that generate, in response to electrical power received from power supply 104 or control circuit 108, a magnetic output. The rotation of rotor 112 is induced by the magnetic output of stator 110. Varying the magnetic output of stator 110 causes rotor 112 to rotate at different motor speeds, thereby enabling different selectable motor speeds. In at least some embodiments, rotor 112 is configured to rotate in two directions (clockwise and counter-clockwise) based on the polarity of the magnetic output of stator 110.

As shown in FIG. 1 and in one aspect, the permanent split capacitor (PSC) motor 106 is configured to be connected to a power source 104 and to be coupled to a selected one of a first 101 and a second machine 101A. The first machine 101 is configured to operate at a first machine rotational speed and the second machine 101A is configured to operate at a second machine rotational speed. The first machine rotational speed is different from the second machine rotational speed.

Note that the machines 101 and 101A are shown exemplary in FIG. 1 as fans 102 and 102A for use in HVAC systems 100 and 100A respectively. It should be appreciated that the machines 101 and 101A may be any machines that preferably operate at different rotational speeds. In alternative embodiments, PSC motor 106 is configured to be connected to power source 104 and to be coupled to a selected one of a first air moving device 126 and a second air moving device 126A.

Figure 2:
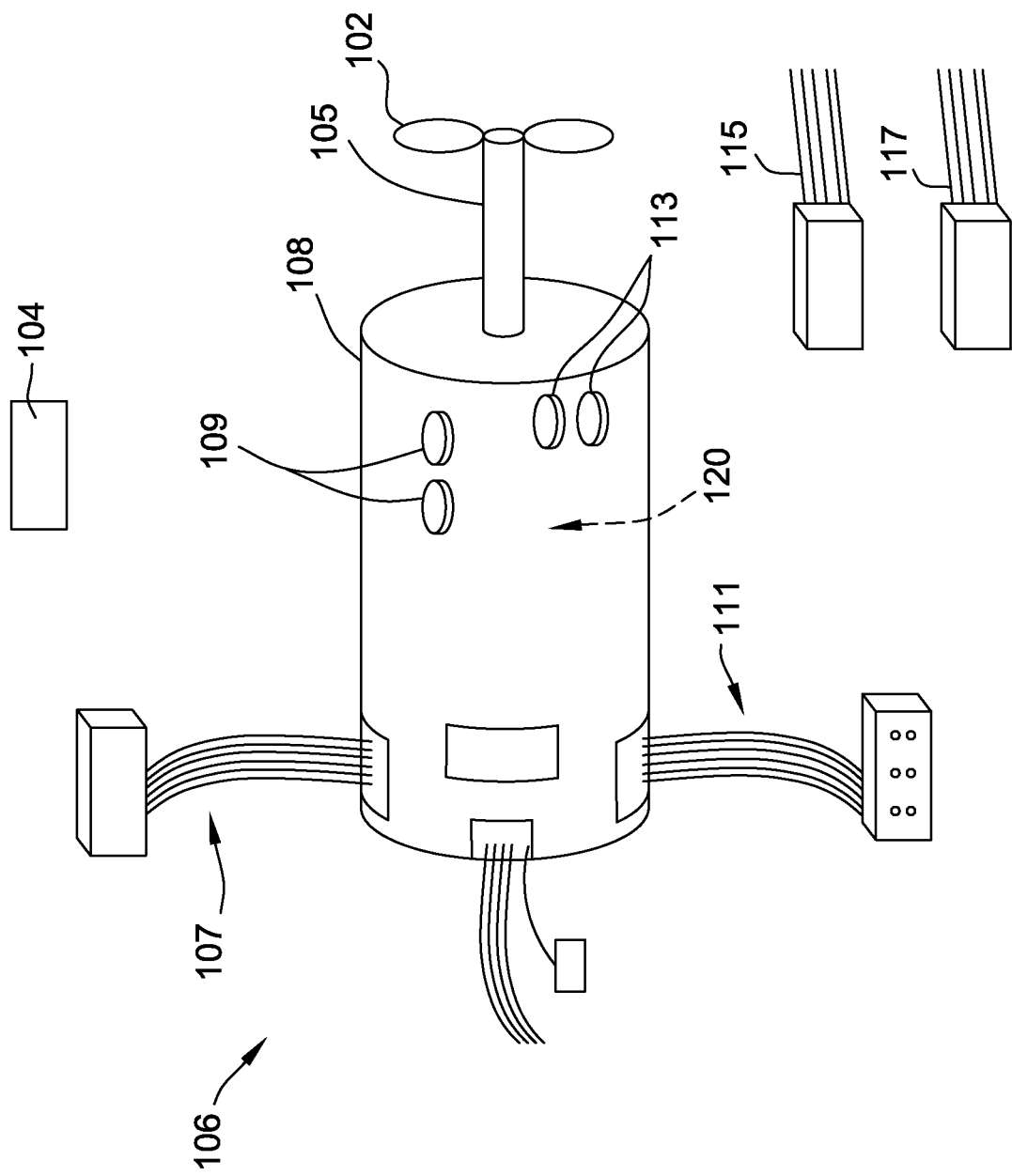
FIG. 2 is an exemplary PSC motor for use in the system shown in FIG. 1 utilizing two wiring harnesses each with a terminal block spaced from the periphery of the motor housing and adapted for use with a clockwise fan wiring harness and a counterclockwise fan wiring harness.

Referring now to FIG. 2, motor 106 is shown. The motor 106 includes a housing 118 defining a cavity 120 inside the housing. The motor 106, as shown, includes a shaft 105 connecting the motor 106 to machine or fan 102.

The motor 106 also includes a first set 107 of electrical motor leads. The first set 107 of electrical motor leads electrically connects the power supply 104 to a first set 109 of windings. A first set 115 of power supply electrical leads may be connectable to the first set 107 of electrical motor leads and to the power supply 104.

The first set 109 of winding, for example, when motor 106 is an induction motor, induce a field into the rotor 112 to cause the rotor 112 to rotate in one of a clockwise or counter clockwise direction at a first rotational speed. For example, the first set 109 of windings may include three (3) pairs of windings. When subjected to 208/230 Volt AC power, the three pairs of winding may cause the rotor 112 to rotate at a synchronous speed of about 1200 PRM and an operating speed of about 1125 RPM.

Continuing to refer to FIG. 2, motor 106 may also include a second set 111 of electrical motor leads. The second set 111 of electrical motor leads electrically connects the power supply 104 to a second set 113 of windings. The first set 115 of power supply electrical leads may be connectable to the second set 111 of electrical motor leads and to the power supply 104.

To rotate the motor 106 is the desired one of clockwise CW or counterclockwise CCW rotation, the sets of windings 109 and 113 must be correspondingly wired for that desired CW or CCW direction. To simplify the wiring during installation of the motor 106 the first set 115 of power supply electrical leads are configured along with the motor installation instructions to connect the winding 109 or 113 in a counterclockwise direction. The first set 115 of leads cooperates either with first set 109 of windings for operating at the first speed or with second set 113 of windings for operating at the second speed.

Figure 3:
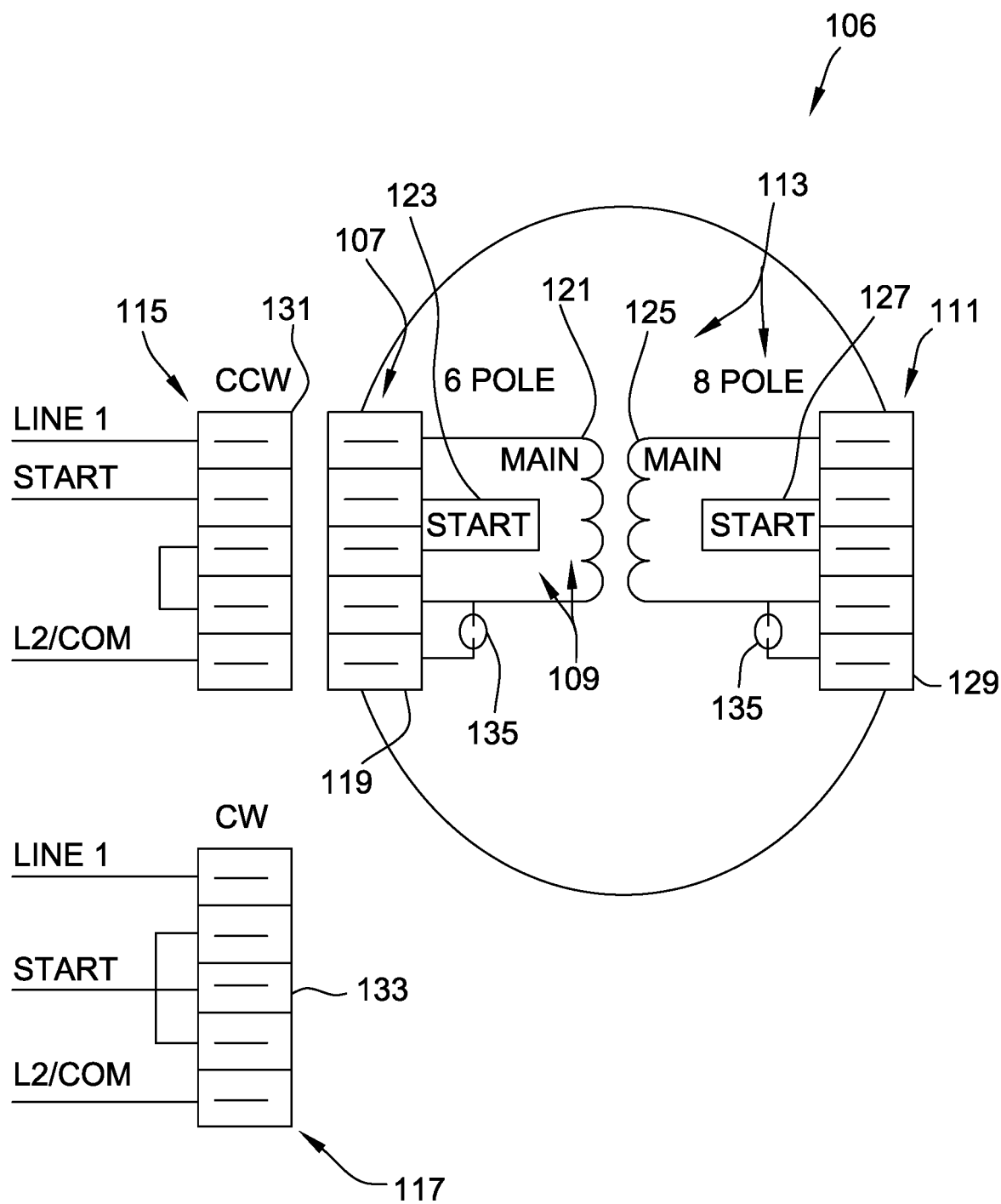
FIG. 3 is an exemplary wiring schematic with terminal block connections of a PSC motor for first and second wiring configurations for use in the first and second system shown in FIG. 1.

As shown in FIG. 3, the HVAC system 100 may be configured with a second set 117 of power supply electrical leads that are configured along with the motor installation instructions to connect the winding 109 or 113 in a clockwise direction.

The second set 113 of windings, for example, when motor 106 is an induction motor, induce a field into the rotor 112 to cause the rotor 112 to rotate in one of a clockwise or counter clockwise direction at a second rotational speed. The second rotational speed is substantially different from the first rotational speed.

For example, the first set 109 of windings may include four (4) pairs of windings. When subjected to 208/230 Volt AC power, the four pairs of winding may cause the rotor 112 to rotate at a synchronous speed of about 900 RPM and an operating speed of about 825 RPM.

Referring now to FIG. 3, the motor 106 includes the first set 109 of windings. The first set of windings 109 may include first main windings 121 and first start windings 123. Similarly, the second set of windings 109 may include second main windings 125 and second start windings 127. The electrical circuits for the start windings include capacitors, so that the start winding is energized out of phase with the main windings to assist in starting the motor. While the start windings 123 and 127 may be energized only during starting in some applications, for induction motors in such HVAC applications the start windings are energized in both startup operation and in run operation.

For a motor 106 that, as shown, is a single phase 208/230 Volt AC powered induction motor, the motor 106 received three lead wires, line 1 (L1), line 2 (L2) and start (a power line that first is electrically routed through the start capacitor and is typically colored brown).

The sets of electrical motor leads and the sets of power supply electrical leads may be groupings of electrical wires that may be physically connected to each other. These leads may have exposed wires at the ends to provide connections or may include terminals at the end for connection with mating terminals on other leads. The terminals may be positioned in terminal blocks that mate with terminal blocks on other leads.

As shown in FIG. 3, the motor 106 may be configured with the first set of motor leads 107 extending from motor housing 118 and a first motor terminal block 119 located on the end of the leads 107. Similarly, the second set of motor leads 111 extends from motor housing 118 and a second motor terminal block 129 located on the end of the leads 107. While the terminal blocks 119 and 129 extend spaced from the housing 118, it should be appreciated that the terminal blocks 119 and 129 may be mounted on the housing.

The system 100 may also include a first power supply terminal block 131 extending from a first end of the first set 115 of power supply electrical leads for connecting the motor 106 in a CCW direction and a second power supply terminal block 133 extending from the end of the second set 117 of power supply electrical leads for connecting the motor 106 in a CW direction.

When a motor is required for the machine (for the first fan with a first rotational speed and a CCW direction) (for example, a 6-pole motor for operation at about 1125 RPM at 208/230 V AC single phase), second end of the first set 115 of power supply electrical leads is connected as instructed to the power supply 104. The first motor terminal block 119 is connected to the first power supply terminal block 131.

When a motor is required for the machine (for the first fan with a first rotational speed and a CW direction) (for example, a 6-pole motor for operation at about 1125 RPM at 208/230 V AC single phase), second end of the second set 117 of power supply electrical leads is connected as instructed to the power supply 104. The first motor terminal block 119 is connected to the second power supply terminal block 133.

When a motor is required for the machine (for the second fan with a second rotational speed and a CCW direction) (for example, an 8-pole motor for operation at about 825 RPM at 208/230 V AC single phase), second end of the first set 115 of power supply electrical leads is connected as instructed to the power supply 104. The second motor terminal block 129 is connected to the first power supply terminal block 131.

When a motor is required for the machine (for the second fan with a second rotational speed and a CW direction) (for example, an 8-pole motor for operation at about 825 RPM at 208/230 V AC single phase), second end of the second set 117 of power supply electrical leads is connected as instructed to the power supply 104. The second motor terminal block 129 is connected to the second power supply terminal block 133.

Figure 4:
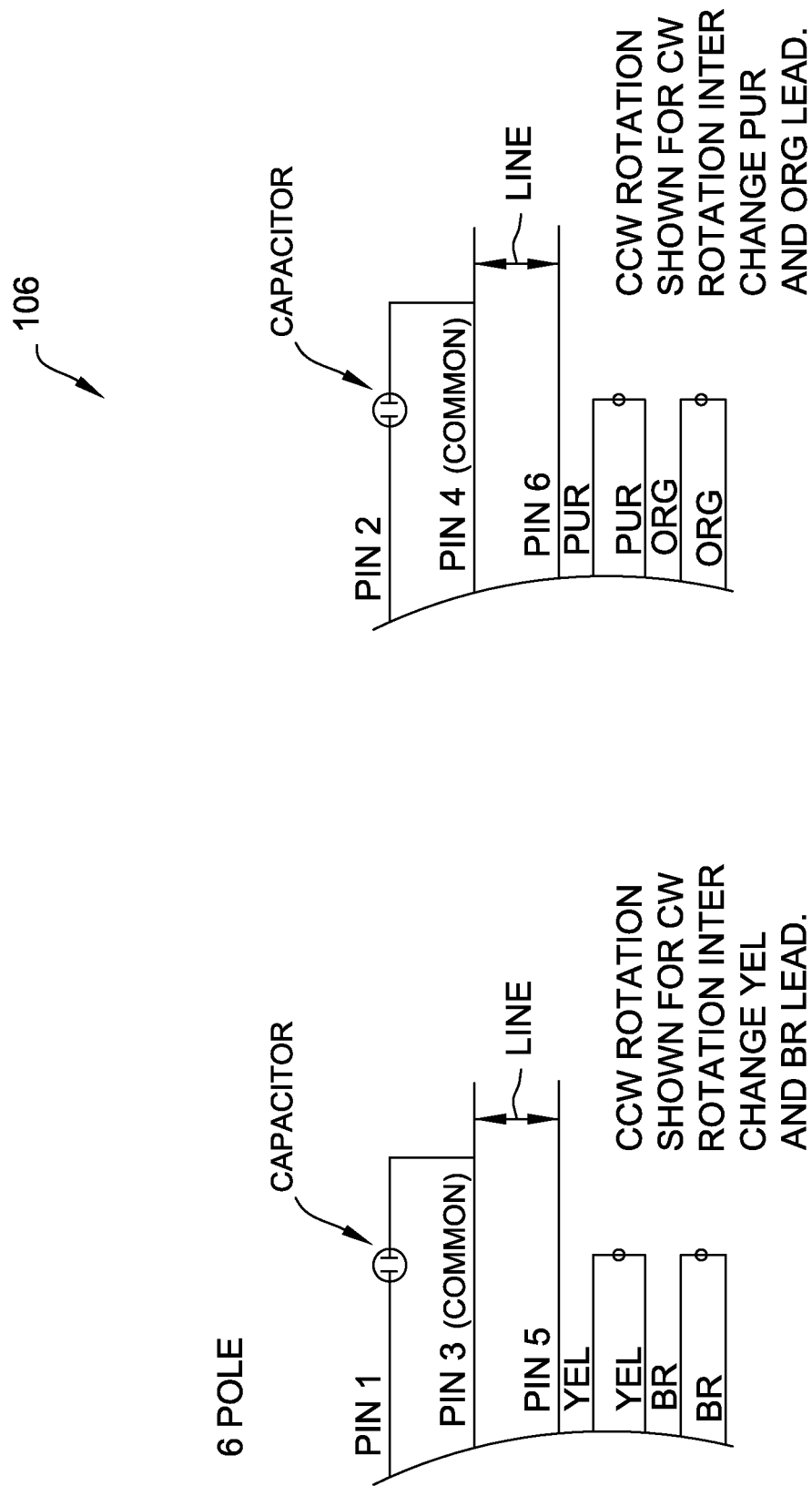
FIG. 4 is an exemplary wiring schematic with pin connections of a PSC motor for first and second wiring configurations for use in the first and second system shown in FIG. 1.

Referring now to FIG. 3 and FIG. 4, an exemplary wiring arrangement for a motor according to the present invention is shown. Note that many other arrangements are possible for providing current to the sets 109 and 113 of windings. For example, the first power supply terminal block 131 may have six pins for receiving terminals. P1 may be connected to line 1, P2 may be connected to Start, P3 and P4 may be connected to each other, P5 may be connected to line 2.

For example, the second power supply terminal block 133 may have six pins for receiving terminals. P1 may be connected to line 1, P3 may be connected to Start, P2 and P4 may be connected to each other, P5 may be connected to line 2.

For example, the first motor terminal block 119 may have six pins for receiving terminals. P1 and P4 may be connected to the main windings, P2 and P3 may be connected to Start windings, P5 may be connected to a thermal protector 135.

For example, the second motor terminal block 129 may have six pins for receiving terminals. P1 and P4 may be connected to the main windings, P2 and P3 may be connected to Start windings, P5 may be connected to thermal protector 135.

Referring now to FIG. 4, the motor 106 includes housing 118, defining a cavity 120 in the housing 118 and having an external periphery 122 of the housing. The motor 106 also includes stator 110 positioned at least partially within the housing 118. The stator 110 includes a body 124 connected to the housing 118 and a first set 109 of windings having a plurality of coils 128 and connected to the body and connectable to the power source and including of a first number of coils. The first set 109 of windings are configured to provide a first rotational speed of the motor when the first set 109 of windings are energized by the power source 104. The first set 109 of windings are configured for use with the first machine 102.

The motor 106 also includes a second set 113 of windings having a plurality of coils 128 and connected to the body 124 and connectable to the power supply or source 104. The second set 113 of winding include a first number of coils, the second set 113 of windings configured to provide a second rotational speed of the motor 106 when the second set 113 of windings are energized by the power source 104 and when the first set 109 of windings are not energized, the first set 109 of windings being different than the second set 113 of windings, the second rotational speed of the motor 106 being different from the first rotational speed of the motor 106, the second set 113 of windings configured for use with the second machine.

The motor 106 also includes rotor 112 disposed adjacent the stator 110 and configured to rotate relative to the stator 110 about an axis of rotation 116 induced at least partially by a magnetic output of one of the first set 109 of windings and the second set 113 of windings, the first set of windings 109 configured for use with the first machine to rotate the first machine at the first machine rotational speed and the second set 113 of windings configured for use with the second machine to rotate the second machine at the second machine rotational speed.

Figure 5:
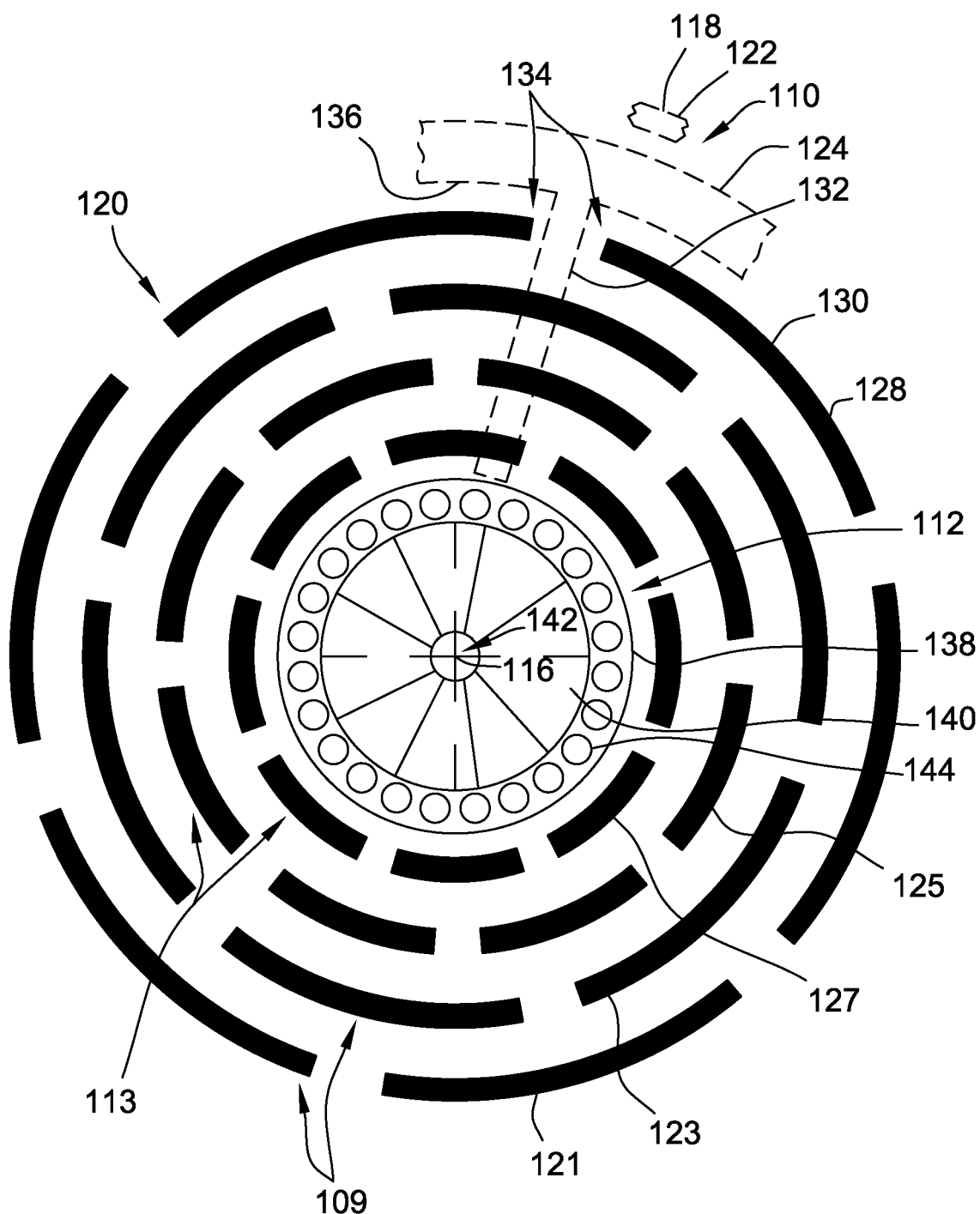
FIG. 5 is an exemplary stator of the PSC motor of FIG. 3 for first and second winding configurations for use in the first and second systems shown in FIG. 1.

As shown in FIG. 5, the coils 128 may be positioned in motor 106 in any suitable manner. For example and as shown, the coils 128 are formed by wires 130 and wrapped around at least one tooth or protrusion 132 extending inwardly from body 124 of stator 110. The tooth or teeth 132 define opening 134 between adjacent teeth. The wires 130 are wrapped around one or more teeth 132 and over the opposed ends of the teeth 132, filling the openings 134 between the teeth.

As shown in FIG. 5, the first set 109 of windings are first wound onto the stator 110 with the first main windings 121 being positioned against inner periphery 136 of stator 110. The first main windings 121 are wrapped around one or more teeth 132 and over the opposed ends of the teeth 132, filling the openings 134 between the teeth. The first main windings 121 may as shown include three pairs of coils, for a total six coils forming the three pairs. For each electrical cycle from a 60 cycle per second AC power source, the motor advances ⅓ of a revolution, resulting in a synchronous rotation speed for the rotor 112 of about 1200 PRM with the operating speed of around 1125 RPM. Actual rotation speeds will be somewhat less and are dependent on load placed on the motor 106.

Next, the first start windings 123 are positioned against the first main windings. The first start windings 123 are wrapped around one or more teeth 132 and over the opposed ends of the teeth 132, filling the openings 134 between the teeth. The first start windings 123 may be wrapped around different teeth than the first main windings 121.

The first start windings 123 may as shown include three pairs of coils, for a total six coils forming the three pairs. For each electrical cycle from a 60 cycle per second AC power source, the motor advances ⅓ of a revolution, resulting in a rotation speed for the rotor 112 of about 1125 RPM. Note that the electrical circuit for powering the first start windings 123 includes a capacitor so that the energizing of the first start windings is out of phase with the first main windings. The out of phase energizing assists in the starting of the motor. The first start windings 123 may be utilized solely for starting, or may, as described herein, be used during normal operation of the motor.

As shown in FIG. 5, next the second main windings 125 of the second set 113 of windings is positioned against the first start windings 123. The second main windings 125 are wrapped around one or more teeth 132 and over the opposed ends of the teeth 132, filling the openings 134 between the teeth. The second main windings 125 may be wrapped around different teeth than either the first main windings 121 or the first start windings 123. The second main windings 125 may as shown include four pairs of coils, for a total eight coils forming the four pairs. For each electrical cycle from a 60 cycle per second AC power source, the motor advances ¼ of a revolution, resulting in a synchronous rotation speed for the rotor 112 of about 900 PRM and an operating speed of about 825 RPM. Actual rotation speeds will be somewhat less and are dependent on load placed on the motor 106.

Next, the second start windings 127 are positioned against the second main windings 125. The second start windings 127 are wrapped around one or more teeth 132 and over the opposed ends of the teeth 132, filling the openings 134 between the teeth. The second start windings 127 may be wrapped around different teeth than any of the first main windings 121, the first start windings 123, or the second main windings 125.

The second start windings 127 may as shown include four pairs of coils, for a total eight coils forming the four pairs. For each electrical cycle from a 60 cycle per second AC power source, the motor advances ¼ of a revolution, resulting in a synchronous rotation speed for the rotor 112 of about 900 RPM and an operating speed of about 825 RPM. Actual rotation speeds will be somewhat less and are dependent on load placed on the motor 106.

Note that the electrical circuit for powering the second start windings 127 includes a capacitor so that the energizing of the second start windings 127 is out of phase with the second main windings 125. The out of phase energizing assists in the starting of the motor. The second start windings 127 may be utilized solely for starting, or may, as described herein, be used during normal operation of the motor.

As shown in FIG. 5 the rotor 112 may include ends 138 and a hub 140 connected to the ends. The hub 140 includes a central opening 142 for receiving shaft 105. Pins or bars 144 extend in a direction parallel to axis of rotation 116. The bars 144 may be skewed for reasons including to reduce noise. The bars 144 may be equally spaced apart. The number of bars 144 in a rotor may be chosen to be a multitude of the number of poles in the first set 109 of windings and a multitude of the number of poles in the second set 113 of windings. For example, the number of bars may be 24 or 48, which are multiples of 6 and 8.

A field may be induced by the stator windings sets 109 and 113 into the rotor 112. The induced field of the rotor and the field of the stator windings cooperate to rotate the rotor 112 about the stator 110.

Figure 6:
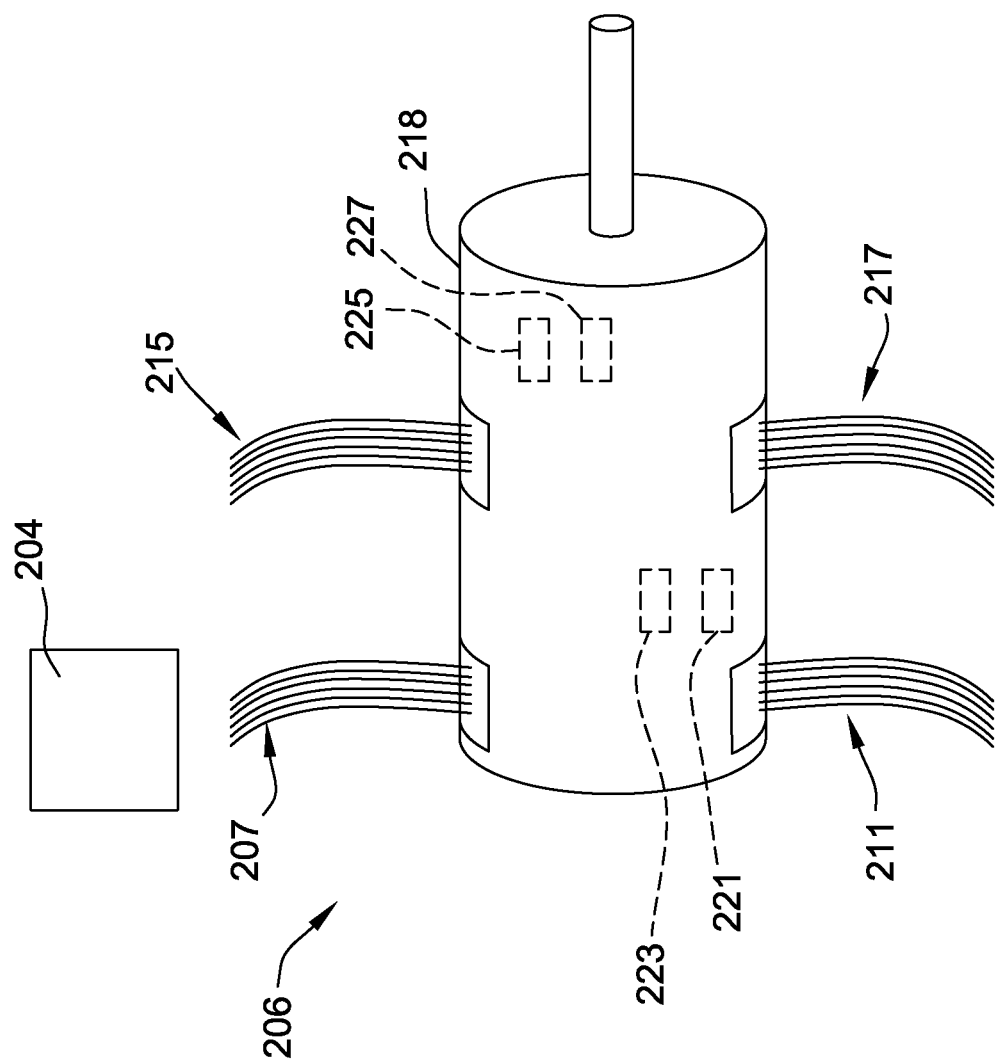
FIG. 6 is another embodiment of a PSC motor for use in the system shown in FIG. 1 utilizing four wiring harnesses without terminal blocks.

Referring now to FIG. 6, motor 206 is provided. The motor 206 is similar to motor 106 of FIGS. 1-4, except motor 206 has leads that are different than the leads 107, 111, 115 and 117 of the motor 106. The motor 206 includes a housing 218 which defines a cavity 220 for receiving first main windings 221, first start windings 223, second main windings 225 and second start windings 227. The motor 206 includes a set of (Counterclockwise) CCW first motor speed winding leads 207 with corresponding installation directions for connecting the power supply 204 to the first main windings 221 and to the first start windings 223 in a CCW direction. The motor 206 also includes a set of (Clockwise) CW first motor speed winding leads 211 with corresponding installation directions for connecting the power supply 204 to the first main windings 221 and to the first start windings 223 in a CW direction.

Further, the motor 206 includes a set of (Counterclockwise) CCW second motor speed winding leads 215 with corresponding installation directions for connecting the power supply 204 to the second main windings 225 and to the second start windings 227 in a CCW direction. The motor 206 also includes a set of (Clockwise) CW second motor speed winding leads 217 with corresponding installation directions for connecting the power supply 204 to the second main windings 225 and to the second start windings 227 in a CW direction. The leads 207, 211, 215 and 217 may have bare wire connections or terminal connections.

Figure 7:
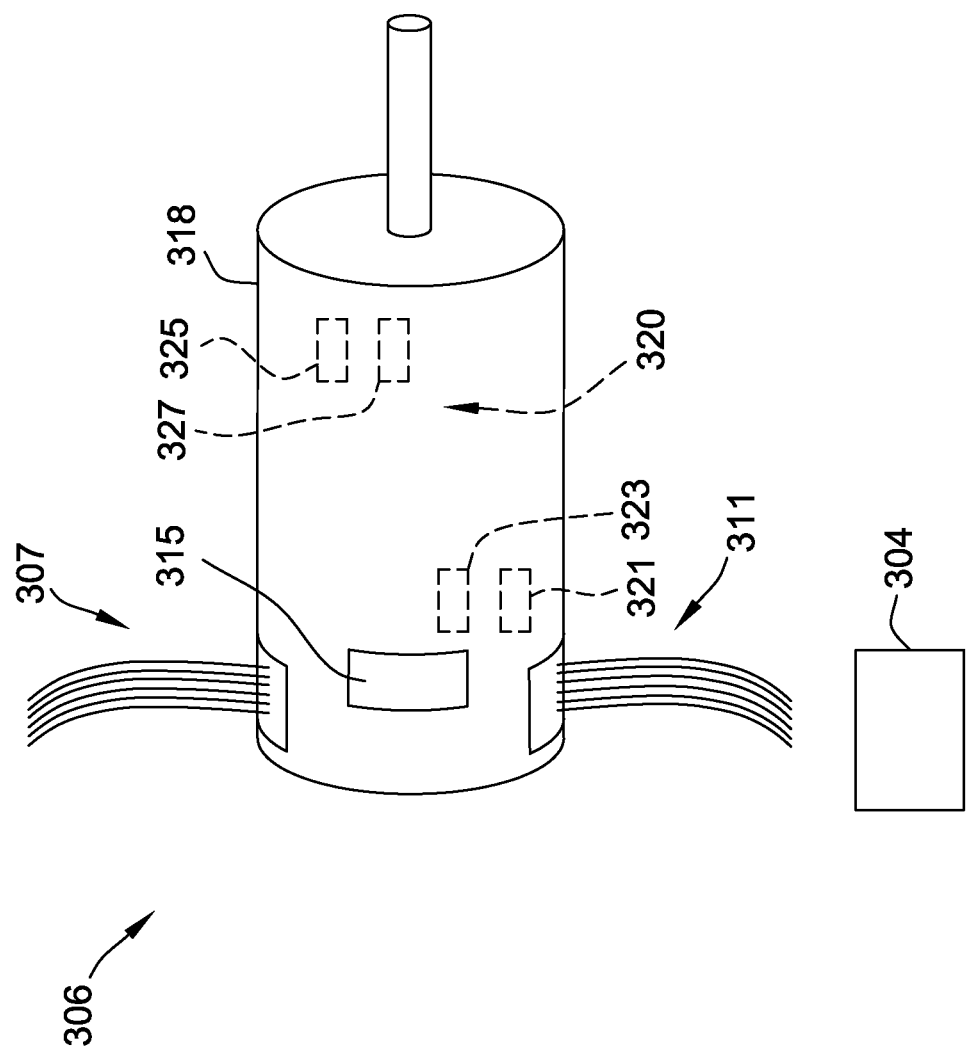
FIG. 7 is another embodiment of a PSC motor for use in the system shown in FIG. 1 utilizing two wiring harnesses without terminal blocks and a separate mechanism for reversing the motor.

Referring now to FIG. 7, motor 306 is provided. The motor 306 is similar to motor 106 of FIGS. 1-4, except motor 306 has leads that are different than the leads 107, 111, 115 and 117 of the motor 106. The motor 206 includes a housing 318 which defines a cavity 320 for receiving first main windings 321, first start windings 323, second main windings 325 and second start windings 327. The motor 306 includes a set of first motor speed winding leads 307 with corresponding installation directions for connecting the power supply 304 to the first main windings 321 and to the first start windings 323. The motor 206 also includes a set of second motor speed winding leads 311 with corresponding installation directions for connecting the power supply 204 to the second main windings 225 and to the second start windings 227.

Further, the motor 306 includes a mechanism 315 with corresponding installation directions for selecting motor rotation direction for the motor 306 from one of a (Counterclockwise) CCW motor rotation direction and a (Clockwise) CW motor rotation direction. The mechanism 315 may be, for example, a switch as shown or leads that may have bare wire connections or terminal connections.

Figure 8:
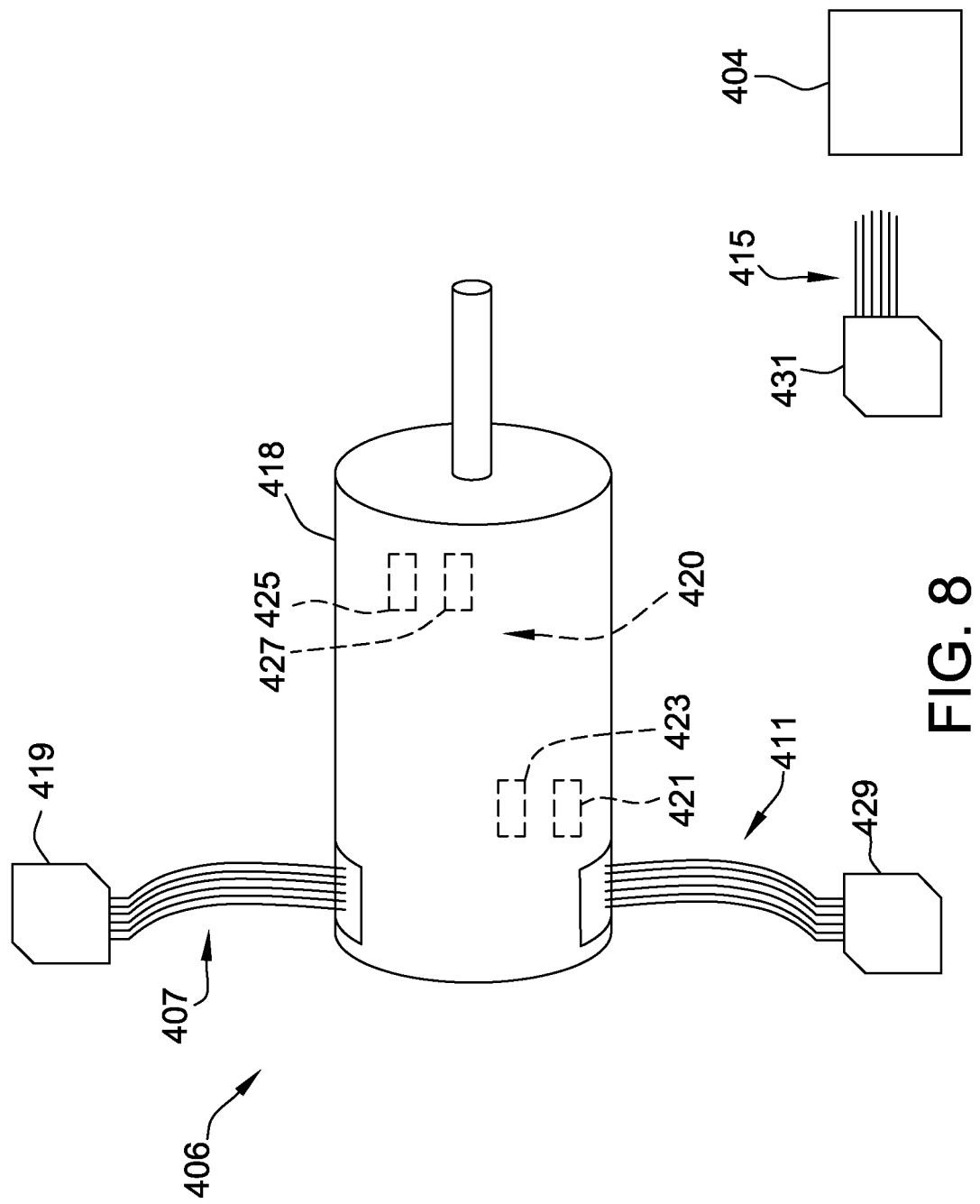
FIG. 8 is another embodiment of a PSC motor for use in the system shown in FIG. 1 utilizing two wiring harnesses each with a terminal block spaced from the periphery of the motor housing and adapted for use with two position fan wiring harness that provides for clockwise and counterclockwise fan rotation.

Referring now to FIG. 8, motor 406 is provided. The motor 406 is similar to motor 106 of FIGS. 1-4, except motor 406 has leads that are different than the leads 107, 111, 115 and 117 of the motor 106. The motor 406 includes a housing 418 which defines a cavity 420 for receiving first main windings 421, first start windings 423, second main windings 425 and second start windings 427. The motor 406 includes a set of first motor speed winding leads 407 with corresponding installation directions for connecting the power supply 404 to the first main windings 421 and to the first start windings 423 in both a CCW direction and a CW direction.

Further, the motor 406 includes a set of second motor speed winding leads 411 with corresponding installation directions for connecting the power supply 404 to the second main windings 425 and to the second start windings 427 in a selected one of a CCW direction and a CW direction.

The motor 406 also includes a set of power supply leads 415 with corresponding installation directions for connecting the power supply 404 either to the first main windings 421 and first start windings 423 or to the second main windings 425 and the second start windings 427. The power supply leads 415 includes a power supply terminal block 431 that has first and second orientation directions for cooperation with the first motor speed winding leads 407 and with the second motor speed winding leads 411. The first orientation direction is for CCW motor rotation and the second orientation is for CW motor rotation.

The first motor speed winding leads 407 includes a first motor spend terminal block 419 that cooperates with the power supply terminal block 431 in a first or CCW motor rotation orientation and in a second or CW motor rotation orientation.

Likewise, the second motor speed winding leads 411 includes a second motor speed terminal block 429 that cooperates with the power supply terminal block 431 in a first or CCW motor rotation orientation and in a second or CW motor rotation orientation.

As shown in FIG. 8, the motor terminal blocks 419 and 429 mate with the power supply terminal block 431. The motor terminal blocks 419 and 429 as well as the power supply terminal block 431 may have a rectangular or other shape that has an axis or centerline 437 about which the blocks may be rotated 180 degrees and still be fitted into the mating block(s).

Figure 9:
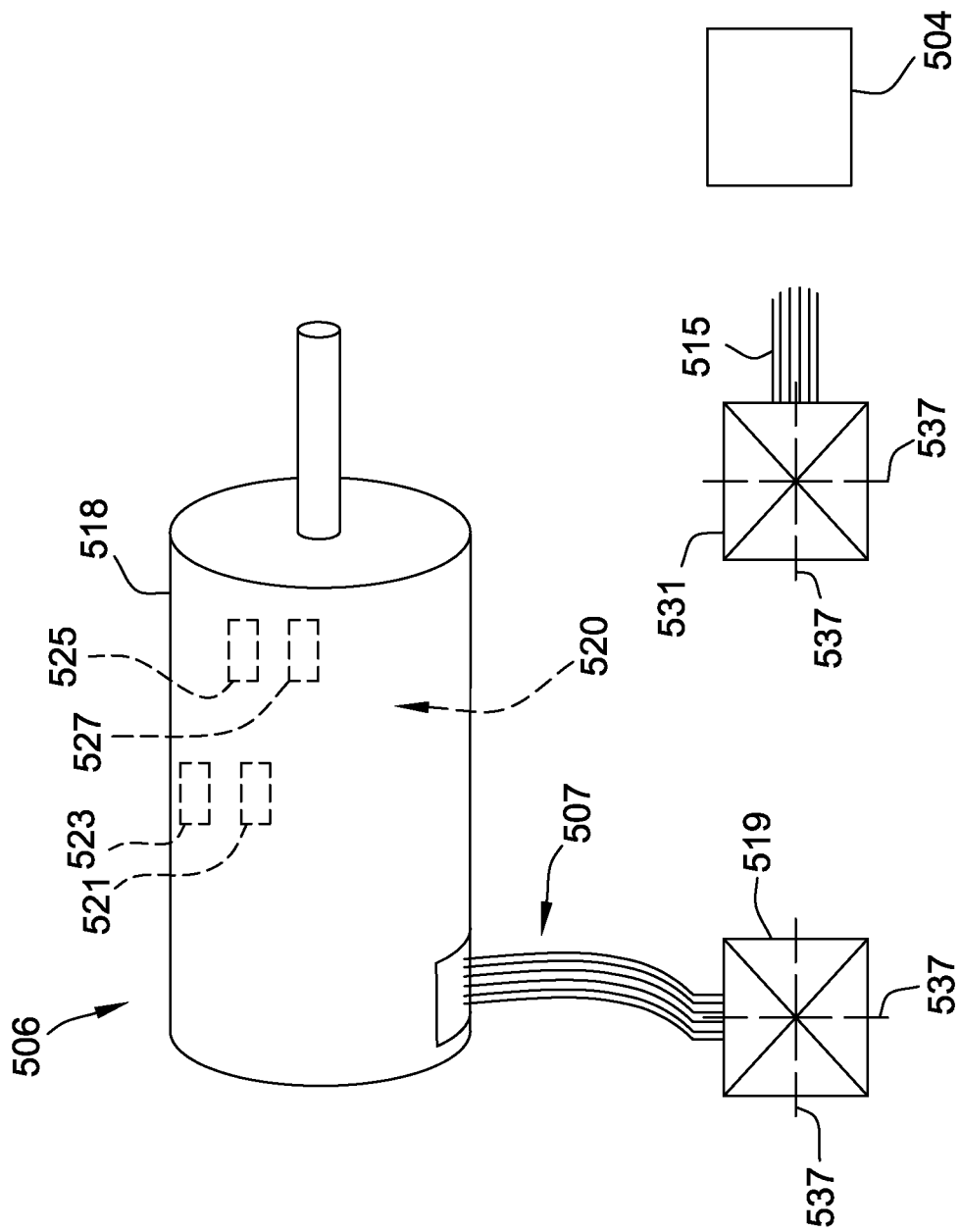
FIG. 9 is another embodiment of a PSC motor for use in the system shown in FIG. 1 utilizing one wiring harness with a terminal block spaced from the periphery of the motor housing and adapted for use with a four-position fan wiring harness that provides for clockwise and counterclockwise fan rotation and for a first and a second fan application.
Figure 11:
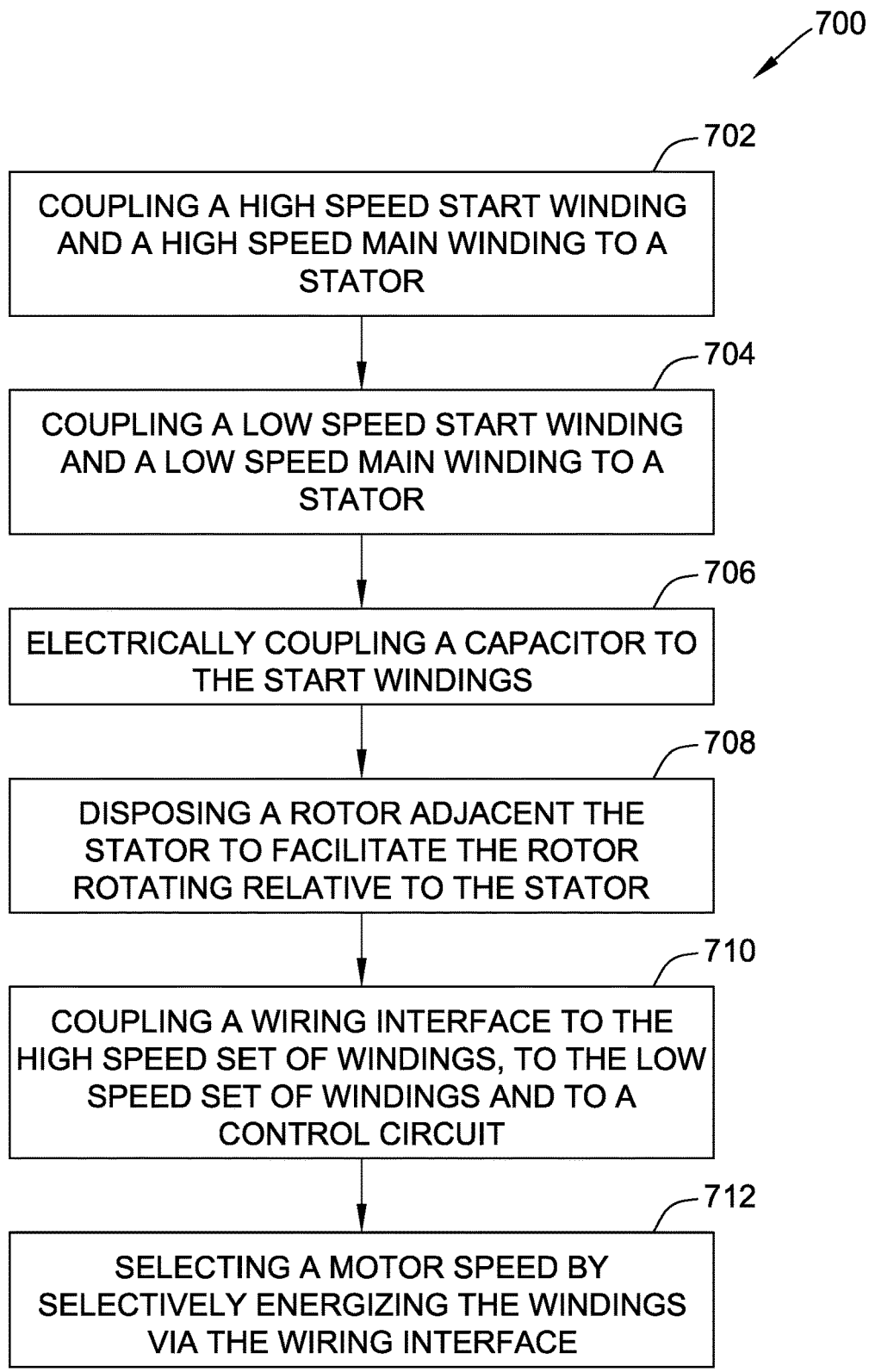
FIG. 11 is a flow diagram of an exemplary method for utilizing a PSC motor in the system shown in FIG. 1.

Referring now to FIG. 9, motor 506 is provided. The motor 506 is similar to motor 106 of FIGS. 1-4, except motor 506 has leads that are different than the leads 107, 111, 115 and 117 of the motor 106. The motor 506 includes a housing 518 which defines a cavity 520 for receiving first main windings 521, first start windings 523, second main windings 525 and second start windings 527. The motor 506 includes a set of motor winding leads 507 with corresponding installation directions for connecting the power supply 404 to the first main windings 521 and to the first start windings 523 or to the second main windings 525 and to the second start windings 527 in a selected one of a CCW direction and a CW direction.

The motor 506 also includes a set of power supply leads 515 with corresponding installation directions for connecting the power supply 504 either to the first main windings 521 and first start windings 523 or to the second main windings 525 and the second start windings 527 in either of a CW motor rotation direction or a CCW motor rotation direction. The power supply leads 515 includes a power supply terminal block 531 that has first, second, third and fourth orientation directions for cooperation with a motor terminal block 519 on the motor winding leads 507. The first orientation direction is for operation of the motor at the first speed with a CCW motor rotation and the second orientation is for operation of the motor at the first speed with a CW motor rotation. The third orientation direction is for operation of the motor at the second speed with a CCW motor rotation and the fourth orientation is for operation of the motor at the second speed with a CW motor rotation.

As shown in FIG. 9, the motor terminal block 519 mates with the power supply terminal block 531. The motor terminal block 519 and the power supply terminal block 531 may have a square or other shape that has a pair of axes or centerlines 537 about which the blocks may be rotated any combination of 90 degrees and still be fitted into the mating block.

Referring again to FIG. 1, in the exemplary embodiment, during a field installation of system 100 or installation of motor 106 in a previously installed system 100, the installer determines a rotational speed and rotational direction for motor 106. After determining the rotational speed and rotational direction, the installer couples power source 104 to motor 106 using wiring interface 114 in the first or second wiring configurations. In one embodiment, if motor 106 is coupled to control circuit 108 prior to installation, wiring interface 114 may be in the second wiring configuration by default to reduce the risk of overcurrent conditions. Most PSC motors are designed for a single operating rotational speed, and therefore the installer must maintain stock of multiple motors in different configurations to be prepared for different installation environments. However, motor 106 is configured to provide flexibility in stock and installation by operating at a plurality of motor speeds. Accordingly, the installer may reduce his or her stock of different motor configurations without reducing installation flexibility.

In at least some embodiments, to aid the installers with performing installation of motor 106, one or more installation guides may be added to motor 106 that the installer may refer to while coupling motor 106 to control circuit 108. FIG. 10 is an exemplary installation guide 600 that may be used in system 100. In the exemplary embodiment, guide 600 is coupled to or integrated with motor 106 such that the installer can refer to guide 600 without additional materials (e.g., manuals, instruction pamphlets, etc.). In one example, guide 600 is a wiring instruction label coupled to motor 106. In other embodiments, guide 600 may be separate from motor 106.

Guide 600 instructs the installer how to couple terminals (see FIGS. 3-4) to control circuit 108 (shown in FIG. 1) in the various wiring configurations. Guide 600 provides instructions for each terminal of stator 110 (shown in FIG. 1) to insulate, couple to another terminal, or couple to a wiring harness of control circuit 108 (i.e., "CCW ROTATION—HIGH SPEED", "CW ROTATION—HIGH SPEED", "CCW ROTATION—LOW SPEED, & "CW ROTATION—LOW SPEED"). In the exemplary embodiment, the voltage is 208-230V, which is shown in the left side of guide 600. It should be appreciated that a voltage of 108-120V may be utilized in this invention.

FIG. 10 is a flow diagram of an exemplary method 700 for assembling a PSC motor that may be used with system 100 (shown in FIG. 1). Method 700 may be performed for other motor-based systems, such as pumps. In other embodiments, method 800 includes additional, fewer, or alternative steps, including those described elsewhere herein.

Method 700 begins with step 702 of coupling a high-speed start winding and a high speed main winding (i.e., a first set or high-speed set of windings) to a stator. The method further includes step 704 of coupling a low speed start winding and a low speed main winding (i.e., a second set or low speed set of windings) to a stator. In some embodiments, stator includes a plurality of teeth that are configured to receive the start and main windings. The extended sets of main windings are also coupled to the stator to facilitate producing motor speeds. In the exemplary embodiment, the method further includes coupling the start winding to the stator in parallel to the main winding. The method further includes step 706 of electrically coupling a capacitor to the start windings. In some embodiment the capacitors are coupled to the start windings in series. The method further includes step 708 of disposing a rotor adjacent the stator to facilitate the rotor rotating relative to the stator at a selectable one of a first motor speed and a second motor speed induced by a magnetic output of the start and main windings. The method further includes step 710 of coupling a wiring interface to the high-speed set of windings and to the low speed set of windings to facilitate coupling the high-speed set of windings and the low speed set of windings to a control circuit. In the example embodiment, the wiring interface is configured to be coupled to the control circuit in a first wiring configuration associated with a first operating speed and a second wiring configuration associated with a second operating speed. The method further includes step 712 of selecting a motor speed by selectively energizing the windings via the wiring interface. The wiring interface is configured to enable the control circuit to select a motor speed by selectively energizing the high-speed set of windings and the low speed set of windings via the wiring interface.

The apparatus, methods, and systems described herein provide an electric motor and a stator assembly of the electric motor. The stator assembly is configured to provide an electric motor that may be used in additional applications to reduce inventory and simplify repair and replacement. For example, embodiments of the stator assembly include winding that provide a first or lower speed and a second or higher speed. In addition, in some embodiments, provide for wiring harnesses that simplify the installation of the motor. As a result, the motor may be used for multiple applications and reduce inventory and related costs.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent split capacitor (PSC) motor configured to be connected to a power source and for coupling to a selected one of a first and a second machine, the first machine configured to operate at a first machine rotational speed and the second machine configured to operate at a second machine rotational speed, the first machine rotational speed being different than the second machine rotational speed, the motor comprising:
   a housing, defining a cavity therein and having an external periphery thereof;
   a stator positioned at least partially within said housing and defining an axis of rotation, said stator comprising:
      a body connected to said housing;
      a first set of windings having a plurality of coils and connected to said body and connectable to the power source and including of a first number of coils, the first set of windings configured to provide a first rotational speed of the motor when said first set of windings are energized by the power source, said first set of windings configured for use with the first machine; and
      a second set of windings having a plurality of coils and connected to said body and connectable to the power source and including of a second number of coils, the second set of windings configured to provide a second rotational speed of the motor when said second set of windings are energized by the power source and when the first set of windings are not energized, the first set of windings being different than the second set of windings, the second rotational speed of the motor being different from the first rotational speed of the motor, said second set of windings configured for use with the second machine;
   a rotor disposed adjacent said stator and configured to rotate relative to said stator about the axis of rotation induced at least partially by a magnetic output of one of said first set of windings and said second set of windings, said first set of windings configured for use with the first machine to rotate the first machine at the first machine rotational speed and said second set of windings configured for use with the second machine to rotate the second machine at the second machine rotational speed;
   a first set of electrical leads, at least one of the leads of the first set of electrical leads electrically connected to the first set of windings, the first set of electrical leads connectable to the power source and configured to rotate the motor at the first rotational speed of the motor and, when mounted to the first machine, to operate the first machine at the first machine rotational speed; and
   a second set of electrical leads, at least one of the leads of the second set of electrical leads electrically connected to the second set of windings, the second set of electrical leads connectable to the power source and configured to rotate the motor at the second rotational speed of the motor and, when mounted to the second machine, to operate the second machine at the second rotational speed, at least one of the leads of the second set of electrical leads being different than at least one of the leads of the first set of electrical leads.

2. A PSC motor in accordance with claim 1, wherein:
   said first set of windings defines a six-pole winding configuration; and
   said second set of windings defines an eight-pole winding configuration.

3. A PSC motor in accordance with claim 1:
   wherein said first set of windings and said second set of windings are main windings;
   further comprising a first set of start windings having a plurality of coils;
   further comprising a second set of start windings having a plurality of coils; and
   further comprising a capacitor electrically coupled in series with a selected one of said first set of start windings and second set of start windings.

4. A PSC motor in accordance with claim 1:
   wherein at least the first rotational speed of the motor is in a clockwise direction;
   further comprising a third set of electrical leads, at least one of the leads of the third set of electrical leads electrically connected to the first set of windings, the third set of electrical leads connectable to the power source to rotate the motor at a counterclockwise rotational direction of the first rotational speed of the motor and, when mounted to the first machine, to operate the first machine at the first machine rotational speed, at least one of the leads of the third set of electrical leads being different than at least one of the leads of the first set of electrical leads;
   wherein at least the second rotational speed of the motor is in a clockwise direction; and
   further comprising a fourth set of electrical leads, at least one of the leads of the fourth set of electrical leads electrically connected to the second set of windings, the fourth set of electrical leads connectable to the power source to rotate the motor at a counterclockwise rotational direction of the second rotational speed of the motor and, when mounted to the first machine, to operate the second machine at the second machine rotational speed, at least one of the leads of the fourth set of electrical leads being different than at least one of the leads of the second set of electrical leads.

5. A PSC motor in accordance with claim 4:
   further comprising a first terminal connected to one of the leads of said first set of electrical leads;
   further comprising a second terminal connected to another one of the leads of said first set of electrical leads;
   further comprising a first motor terminal block defining a first receptacle for receiving the first terminal and a second receptacle for receiving the second terminal;

further comprising a third terminal connected to one of the leads of said second set of electrical leads;

further comprising a fourth terminal connected to another one of the leads of said second set of electrical leads;

further comprising a second motor terminal block defining a third receptacle for receiving said third terminal and a fourth receptacle for receiving said fourth terminal; and further comprising a machine terminal block for cooperation with at least one of said first motor terminal block and said second motor terminal block, the machine terminal block electrically connectable to the power source to operate the motor at one of the first motor speed and the second motor speed.

6. A PSC motor in accordance with claim 5, wherein the machine terminal block cooperates with said first motor terminal block and with said second motor terminal block, the machine terminal block having first and second orientations with respect to said first motor terminal block and with respect to said second motor terminal block, so that the first orientations provide for a clockwise rotation of the motor and so that the second orientations provide for a counterclockwise rotation of the motor.

7. A PSC motor in accordance with claim 6:
wherein said machine terminal block cooperates with said first motor terminal block and with said second motor terminal block to provide for a clockwise rotation of the motor and so that the second orientations provide for a counterclockwise rotation of the motor; and further comprising a second machine terminal block for cooperation with said first motor terminal block and with said second motor terminal block to provide for a counterclockwise rotation of the motor.

8. A PSC motor in accordance with claim 4:
further comprising a motor terminal block for receiving the leads of said first set of electrical leads, for receiving the leads of said second set of electrical leads, for receiving the leads of said third set of electrical leads, and for receiving the leads of said fourth set of electrical leads; and further comprising a machine terminal block for cooperation with said motor terminal block, the machine terminal block electrically connectable to the power source to operate the motor at one of the first motor speed in a clockwise direction, the first motor speed in a counterclockwise direction, the second motor speed in a clockwise direction, and the second motor speed in a counterclockwise direction, the machine terminal block having first, second, third and fourth orientations with respect to said motor terminal block, so that the first orientation provides for a clockwise rotation of the motor at the first motor speed, so that the second orientations provides for a counterclockwise rotation of the motor at the first motor speed, so that the third orientation provides for a clockwise rotation of the motor at the second motor speed, and so that the fourth orientation provides for a counterclockwise rotation of the motor at the second motor speed.

9. A PSC motor in accordance with claim 4, further comprising a mechanism connected to said third set of electrical leads and to said fourth set of electrical leads, said mechanism for selectively configuring the third set of electrical leads to rotate the motor at the counterclockwise rotational direction of the first rotational speed of the motor and for configuring the fourth set of electrical leads to rotate the motor at the counterclockwise rotational direction of the second rotational speed of the motor.

10. A PSC motor in accordance with claim 1:
wherein a plurality of the leads of said first set of electrical leads are extendable outside the cavity of said housing;

wherein a plurality of the leads of said second set of electrical leads are extendable outside the cavity of said housing;

further comprising instructions for connecting the plurality of the leads of said first set of electrical leads extendable outside the cavity of said housing to the power source to provide the first rotational speed of the motor; and further comprising instructions for connecting the plurality of the leads of said second set of electrical leads extendable outside the cavity of said housing to the power source to provide the second rotational speed of the motor.

11. A PSC motor in accordance with claim 10, further comprising a terminal connected to one of the leads of one of said first set of electrical leads extendable outside the cavity of said housing and said second set of electrical leads extendable outside the cavity of said housing.

12. A permanent split capacitor (PSC) motor configured to be connected to a power source and a heating, ventilation, and air conditioning (HVAC) system and for coupling to one of a first air moving device designed to be operated at a first rotational speed and a second air moving device designed to be operated at a second rotational speed, different from the first rotational speed, said motor comprising:

a housing, defining a cavity therein and having an external periphery thereof;

a stator positioned at least partially within said housing and defining an axis of rotation, said stator comprising:
a body connected to said housing;
a first set of windings having a plurality of coils and connected to said body and connectable to the power source and including of a first number of coils, the first set of windings configured to provide a first rotational speed of the motor when said first set of windings are energized by the power source, said first set of windings configured for use with the first air moving device; and a second set of windings having a plurality of coils and connected to said body and connectable to the power source and including of a second number of coils, the second set of windings configured to provide a second rotational speed of the motor when said second set of windings are energized by the power source and when the first set of windings are not energized, the first set of windings being different than the second set of windings, the second rotational speed of the motor being different from the first rotational speed of the motor, said second set of windings configured for use with the second air moving device;

a rotor disposed adjacent said stator and configured to rotate relative to said stator about the axis of rotation induced at least partially by a magnetic output of one of said first set of windings and said second set of windings, said first set of windings configured for use with the first air moving device to rotate the first air moving device at the first air moving device rotational speed and said second set of windings configured for use with the second air moving device to rotate the second air moving device at the second air moving device rotational speed;

a first set of electrical leads, at least one of the leads of the first set of electrical leads electrically connected to the first set of windings, the first set of electrical leads connectable to the power source and configured to rotate the motor at the first rotational speed of the motor and, when mounted to the first air moving device, to operate the first air moving device at the first air moving device rotational speed; and a second set of electrical leads, at least one of the leads of the second set of electrical leads electrically connected to the second set of windings, the second set of electrical leads connectable to the power source and configured to rotate the motor at the second rotational speed of the motor and, when mounted to the second air moving device, to operate the second air moving device at the second rotational speed, at least one of the leads of the second set of electrical leads being different than at least one of the leads of the first set of electrical leads.

13. A PSC motor in accordance with claim 12:

wherein first set of windings and said second set of windings are main windings;

further comprising a first set of start windings including of a first number of windings;

further comprising a second set of start windings electrically coupled to said first set of windings, the second set of windings including of a second number of windings; and further comprising a capacitor electrically coupled in series with a selected one of said first set of start windings and second first set of start windings.

14. A PSC motor in accordance with claim 12:

wherein at least the first rotational speed of the motor is in a clockwise direction;

further comprising a third set of electrical leads, at least one of the leads of the third set of electrical leads electrically connected to the first set of windings, the third set of electrical leads connectable to the power source to rotate the motor at a counterclockwise rotational direction of the first rotational speed of the motor and, when mounted to the first air moving device, to operate the first air moving device at the first air moving device rotational speed, at least one of the leads of the third set of electrical leads being different than at least one of the leads of the first set of electrical leads;

wherein at least the second rotational speed of the motor is in a clockwise direction; and further comprising a fourth set of electrical leads, at least one of the leads of the fourth set of electrical leads electrically connected to the second set of windings, the fourth set of electrical leads connectable to the power source to rotate the motor at a counterclockwise rotational direction of the second rotational speed of the motor and, when mounted to the first air moving device, to operate the second air moving device at the second air moving device rotational speed, at least one of the leads of the fourth set of electrical leads being different than at least one of the leads of the second set of electrical leads; and further comprising a mechanism connected to said third set of electrical leads and to said fourth set of electrical leads, said mechanism for selectively configuring the third set of electrical leads to rotate the motor at the counterclockwise rotational direction of the first rotational speed of the motor and for configuring the fourth set of electrical leads to rotate the motor at the counterclockwise rotational direction of the second rotational speed of the motor.

15. A PSC motor in accordance with claim 12:

wherein at least the first rotational speed of the motor is in a clockwise direction;

further comprising a third set of electrical leads, at least one of the leads of the third set of electrical leads electrically connected to the first set of windings, the third set of electrical leads connectable to the power source to rotate the motor at a counterclockwise rotational direction of the first rotational speed of the motor and, when mounted to the first air moving device, to operate the first air moving device at the first air moving device rotational speed, at least one of the leads of the third set of electrical leads being different than at least one of the leads of the first set of electrical leads;

wherein at least the second rotational speed of the motor is in a clockwise direction;

further comprising a fourth set of electrical leads, at least one of the leads of the fourth set of electrical leads electrically connected to the second set of windings, the fourth set of electrical leads connectable to the power source to rotate the motor at a counterclockwise rotational direction of the second rotational speed of the motor and, when mounted to the first air moving device, to operate the second air moving device at the second air moving device rotational speed, at least one of the leads of the fourth set of electrical leads being different than at least one of the leads of the second set of electrical leads;

further comprising a first terminal connected to one of the leads of said first set of electrical leads;

further comprising a second terminal connected to another one of the leads of said first set of electrical leads;

further comprising a first motor terminal block defining a first receptacle for receiving the first terminal and a second receptacle for receiving the second terminal;

further comprising a third terminal connected to one of the leads of said second set of electrical leads;

further comprising a fourth terminal connected to another one of the leads of said second set of electrical leads;

further comprising a second motor terminal block defining a third receptacle for receiving said third terminal and a fourth receptacle for receiving said fourth terminal; and further comprising an air moving device terminal block for cooperation with at least one of said first motor terminal block and said second motor terminal block, the air moving device terminal block electrically connectable to the power source to operate the motor at one of the first motor speed and the second motor speed.

16. A PSC motor in accordance with claim 15, wherein the air moving device terminal block cooperates with said first motor terminal block and with said second motor terminal block, the air moving device terminal block having first and second orientations with respect to said first motor terminal block and with respect to said second motor terminal block, so that the first orientations provide for a clockwise rotation of the motor and so that the second orientations provide for a counterclockwise rotation of the motor.

17. A PSC motor in accordance with claim 16:

wherein said air moving device terminal block cooperates with said first motor terminal block and with said second motor terminal block to provide for a clockwise rotation of the motor and so that the second orientations provide for a counterclockwise rotation of the motor; and further comprising a second air moving device terminal block for cooperation with said first motor terminal block and with said second motor terminal block to provide for a counterclockwise rotation of the motor.

18. A heating, ventilation, and air conditioning (HVAC) system configured to be connected to a power source, comprising:
   one of a first fan designed to be operated at a first rotational speed and a second fan designed to be operated at a second rotational speed, different from the first rotational speed;
   a permanent split capacitor (PSC) motor configured to be connected to the power source and for coupling to one of said first fan and said second fan, said motor comprising:
   a housing, defining a cavity therein and having an external periphery thereof;
   a stator positioned at least partially within said housing and defining an axis of rotation, said stator comprising:
      a body connected to said housing;
      a first set of windings having a set of coils and connected to said body and connectable to the power source and including of a first number of coils, the first set of windings configured to provide a first rotational speed of the motor when said first set of windings are energized by the power source, said first set of windings configured for use with the first fan; and
      a second set of windings having a set of coils and connected to said body and connectable to the power source and including of a second number of coils, the second set of windings configured to provide a second rotational speed of the motor when said second set of windings are energized by the power source and when the first set of windings are not energized, the first set of windings being different than the second set of windings, the second rotational speed of the motor being different from the first rotational speed of the motor, said second set of windings configured for use with the second fan; and
   a rotor disposed adjacent said stator and configured to rotate relative to said stator about the axis of rotation at a selected one of the set of motor speeds induced at least partially by a magnetic output of one of said first set of windings, and said second set of windings, said first set of windings configured for use with the first fan to rotate the first fan at the first fan rotational speed and said second set of windings configured for use with the second fan to rotate the second fan at the second fan rotational speed;
   a first set of electrical leads, at least one of the leads of the first set of electrical leads electrically connected to at least one of the first set of windings, the first set of electrical leads connectable to the power source and to the first fan to rotate the motor at the first rotational speed of the motor and, when mounted to the first fan, to operate the first fan at the first fan rotational speed; and
   a second set of electrical leads, at least one of the leads of the second set of electrical leads electrically connected to at least one of the second set of windings, the second set of electrical leads connectable to the power source and to the second fan to rotate the motor at the second rotational speed of the motor and, when mounted to the second fan, to operate the second fan at the second rotational speed, at least one of the leads of the second set of electrical leads being different than at least one of the leads of the first set of electrical leads.

19. An HVAC system in accordance with claim 18:
   wherein at least the first rotational speed of the motor is in a clockwise direction;
   further comprising a third set of electrical leads, at least one of the leads of the third set of electrical leads electrically connected to the first set of windings, the third set of electrical leads connectable to the power source to rotate the motor at a counterclockwise rotational direction of the first rotational speed of the motor and, when mounted to the first fan, to operate the first fan at the first fan rotational speed, at least one of the leads of the third set of electrical leads being different than at least one of the leads of the first set of electrical leads;
   wherein at least the second rotational speed of the motor is in a clockwise direction;
   further comprising a fourth set of electrical leads, at least one of the leads of the fourth set of electrical leads electrically connected to the second set of windings, the fourth set of electrical leads connectable to the power source to rotate the motor at a counterclockwise rotational direction of the second rotational speed of the motor and, when mounted to the first fan, to operate the second fan at the second fan rotational speed, at least one of the leads of the fourth set of electrical leads being different than at least one of the leads of the second set of electrical leads;
   further comprising a first terminal connected to one of the leads of said first set of electrical leads;
   further comprising a second terminal connected to another one of the leads of said first set of electrical leads;
   further comprising a first motor terminal block defining a first receptacle for receiving the first terminal and a second receptacle for receiving the second terminal;
   further comprising a third terminal connected to one of the leads of said second set of electrical leads;
   further comprising a fourth terminal connected to another one of the leads of said second set of electrical leads;
   further comprising a second motor terminal block defining a third receptacle for receiving said third terminal and a fourth receptacle for receiving said fourth terminal;
   further comprising a fan terminal block for cooperation with at least one of said first motor terminal block and said second motor terminal block, the fan terminal block electrically connectable to the power source to operate the motor at one of the first motor speed and the second motor speed; and
   wherein the fan terminal block cooperates with said first motor terminal block and with said second motor terminal block, the fan terminal block having first and second orientations with respect to said first motor terminal block and with respect to said second motor terminal block, so that the first orientations provide for a clockwise rotation of the motor and so that the second orientations provide for a counterclockwise rotation of the motor.

20. An HVAC system in accordance with claim 18:
   wherein at least the first rotational speed of the motor is in a clockwise direction;
   further comprising a third set of electrical leads, at least one of the leads of the third set of electrical leads electrically connected to the first set of windings, the third set of electrical leads connectable to the power source to rotate the motor at a counterclockwise rotational direction of the first rotational speed of the motor and, when mounted to the first fan, to operate the first fan at the first fan rotational speed, at least one of the leads of the third set of electrical leads being different than at least one of the leads of the first set of electrical leads;

wherein at least the second rotational speed of the motor is in a clockwise direction;

further comprising a fourth set of electrical leads, at least one of the leads of the fourth set of electrical leads electrically connected to the second set of windings, the fourth set of electrical leads connectable to the power source to rotate the motor at a counterclockwise rotational direction of the second rotational speed of the motor and, when mounted to the first fan, to operate the second fan at the second fan rotational speed, at least one of the leads of the fourth set of electrical leads being different than at least one of the leads of the second set of electrical leads;

further comprising a first terminal connected to one of the leads of said first set of electrical leads;

further comprising a second terminal connected to another one of the leads of said first set of electrical leads;

further comprising a first motor terminal block defining a first receptacle for receiving the first terminal and a second receptacle for receiving the second terminal;

further comprising a third terminal connected to one of the leads of said second set of electrical leads;

further comprising a fourth terminal connected to another one of the leads of said second set of electrical leads;

further comprising a second motor terminal block defining a third receptacle for receiving said third terminal and a fourth receptacle for receiving said fourth terminal;

further comprising a fan terminal block for cooperation with at least one of said first motor terminal block and said second motor terminal block, the fan terminal block electrically connectable to the power source to operate;

wherein said fan terminal block cooperates with said first motor terminal block and with said second motor terminal block, the fan terminal block having first and second orientations with respect to said first motor terminal block and with respect to said second motor terminal block, so that the first orientations provide for a clockwise rotation of the motor and so that the second orientations provide for a counterclockwise rotation of the motor; and further comprising a second fan terminal block for cooperation with said first motor terminal block and with said second motor terminal block to provide for a counterclockwise rotation of the motor.

* * * * *